United States Patent
Shin et al.

(10) Patent No.: US 11,543,712 B2
(45) Date of Patent: Jan. 3, 2023

(54) DISPLAY APPARATUS

(71) Applicant: Samsung Display Co., Ltd., Yongin-si (KR)

(72) Inventors: Dong Hee Shin, Asan-si (KR); Geunho Lee, Hwaseong-si (KR); Yonghee Lee, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 38 days.

(21) Appl. No.: 17/161,418

(22) Filed: Jan. 28, 2021

(65) Prior Publication Data

US 2021/0333607 A1    Oct. 28, 2021

(30) Foreign Application Priority Data

Apr. 23, 2020 (KR) .......... 10-2020-0049436

(51) Int. Cl.
*G02F 1/1345* (2006.01)
*G09G 3/36* (2006.01)
*G02F 1/1368* (2006.01)

(52) U.S. Cl.
CPC ...... *G02F 1/13454* (2013.01); *G02F 1/13456* (2021.01); *G02F 1/13458* (2013.01);
(Continued)

(58) Field of Classification Search
CPC ............. G02F 1/13454; G02F 1/13456; G02F 1/13458; G02F 1/1368; G02F 1/13452;
(Continued)

(56) References Cited

U.S. PATENT DOCUMENTS 9,812,084 B2  11/2017  Kim et al.
2008/0136756 A1*  6/2008  Yeo ...................... G09G 3/3677
                                                           345/87

(Continued)

FOREIGN PATENT DOCUMENTS

KR  10-2016-0013470  2/2016
KR  10-2017-0080848  7/2017

(Continued)

*Primary Examiner* — Grant Sitta
(74) *Attorney, Agent, or Firm* — H.C. Park & Associates, PLC

(57) ABSTRACT

A display apparatus includes: a display panel includes: a plurality of pixels to display an image; a gate driver to drive the pixels; a first part electrically connected to the pixels; and a second part electrically connected to the gate driver. The gate driver includes: a plurality of stages to generate a gate signal to be provided to the pixels; k number of clock wirings to provide k number of clock signals to the plurality of stages; and k number of clock bar wirings to provide k number of clock bar signals to the plurality of stages (where k is a natural number of one or greater), and the second part includes: k number of clock pads electrically connected to the k number of clock wirings, respectively; and k number of clock bar pads electrically connected to the k number of clock bar wirings, respectively. The k number of clock wirings and the k number of clock bar wirings are arranged in a first order, and the k number of clock pads and the k number of clock bar pads are arranged in a second order different from the first order.

18 Claims, 20 Drawing Sheets

(52) U.S. Cl.
CPC ......... *G09G 3/3677* (2013.01); *G02F 1/1368* (2013.01); *G09G 2300/0408* (2013.01); *G09G 2310/08* (2013.01); *G09G 2320/0233* (2013.01)

(58) Field of Classification Search
CPC ......... G09G 3/3677; G09G 2300/0408; G09G 2310/08; G09G 2320/0233; G09G 2300/0426; G09G 2310/0286; G09G 3/3674; G09G 3/3275; G09G 2340/0421
See application file for complete search history.

(56) References Cited

U.S. PATENT DOCUMENTS

| | | | |
|---|---|---|---|
| 2008/0136809 A1* | 6/2008 | Lee | G09G 3/3677 345/214 |
| 2013/0009919 A1* | 1/2013 | Park | G09G 3/3677 345/204 |
| 2015/0187247 A1* | 7/2015 | Lee | G09G 3/20 345/205 |
| 2017/0200420 A1* | 7/2017 | No | G11C 19/287 |
| 2018/0129093 A1 | 5/2018 | Hong | |
| 2019/0064622 A1* | 2/2019 | Im | G02F 1/136286 |
| 2019/0066563 A1* | 2/2019 | Seo | G09G 3/2003 |

FOREIGN PATENT DOCUMENTS

| | | |
|---|---|---|
| KR | 10-2018-0050464 | 5/2018 |
| KR | 10-2019-0022972 | 3/2019 |
| KR | 10-1931775 | 3/2019 |

* cited by examiner

DISPLAY APPARATUS

CROSS-REFERENCE TO RELATED APPLICATION

This application claims priority from and the benefit of Korean Patent Application No. 10-2020-0049436, filed on Apr. 23, 2020, which is hereby incorporated by reference for all purposes as if fully set forth herein.

BACKGROUND

Field

Implementations of the invention relate generally to a display apparatus and, more specifically, to a display apparatus having a gate driver embedded in a display panel with improved display quality.

Discussion of the Background

In general, a display apparatus includes a display panel including a plurality of gate lines, a plurality of data lines, and a plurality of pixels connected to the plurality of gate lines and the plurality of data lines. A gate driver provides gate signals to the plurality of gate lines and a data driver outputs data signals to the plurality of data lines are connected to the display panel.

The gate driver may be embedded directly in the display panel through a thin film process. The gate driver includes a plurality of stages and a plurality of wirings providing a gate driving signal to the plurality of stages.

The above information disclosed in this Background section is only for understanding of the background of the inventive concepts, and, therefore, it may contain information that does not constitute prior art.

SUMMARY

Display apparatus constructed according to the principles and embodiments of the invention can improve display quality by removing horizontal line smear.

For example, if the clock wirings and the clock bar wirings are alternately arranged, the magnitude of a ripple voltage generated in the reference voltage may decrease, thereby the horizontal line smear can be reduced or prevented from appearing on the screen of the display panel, thereby improving display quality.

Further, when the clock wirings and the clock bar wirings are alternately arranged, the difference in length between bridge wirings electrically connected to the clock wirings to which the clock signals are applied and the bridge wirings electrically connected to the clock bar wirings to which the clock bar signals are applied are reduced. When the difference in length between the bridge wirings is reduced, the difference decreases between the parasitic capacitances formed between the bridge wirings and the reference electrode, and as a result, the magnitude of a ripple voltage generated in the reference voltage can be reduced.

Additional features of the inventive concepts will be set forth in the description which follows, and in part will be apparent from the description, or may be learned by practice of the inventive concepts.

According to one aspect of the invention, a display apparatus including a display panel includes: a plurality of pixels to display an image; a gate driver to drive the pixels; a first part electrically connected to the pixels; and a second part electrically connected to the gate driver. The gate driver includes: a plurality of stages to generate a gate signal to be provided to the pixels; k number of clock wirings to provide k number of clock signals to the plurality of stages; and k number of clock bar wirings to provide k number of clock bar signals to the plurality of stages (where k is a natural number of one or greater), and the second part includes: k number of clock pads electrically connected to the k number of clock wirings, respectively; and k number of clock bar pads electrically connected to the k number of clock bar wirings, respectively. The k number of clock wirings and the k number of clock bar wirings are arranged in a first order, and the k number of clock pads and the k number of clock bar pads are arranged in a second order different from the first order.

A first clock wiring of the k number of clock wirings to receive a first clock signal may be disposed adjacent to a first clock bar wiring of the k number of clock bar wirings, receive a first clock bar signal having a phase inverted with respect to a phase of the first clock signal.

The first clock bar wiring may be disposed between the first clock wiring and a second clock wiring to receive a second clock signal delayed from the first clock signal.

The first part may include a first pad part and the second part may include a second pad part and the display panel may further include an intermediate wiring part to electrically connect the second pad part and the gate driver. The intermediate wiring part may further include: k number of first intermediate wirings to electrically connect the k number of clock pads to the k number of clock wirings, respectively; and k number of second intermediate wirings to electrically connect the k number of clock bar pads to the k number of clock bar wirings, respectively.

At least one of the k number of first intermediate wirings may intersect at least one of the k number of second intermediate wirings.

The k number of first intermediate wirings may be disposed on a first layer, and each of the k number of second intermediate wirings may include: a lower wiring disposed on the first layer; and an upper wiring disposed on a second layer different from the first layer.

At least one of the k numbers of first intermediate wiring may intersect the upper wiring of at least one of the k number of second intermediate wirings.

The intermediate wiring part may further include a contact part to which the lower wiring and the upper wiring are connected.

The lower wiring and the upper wiring may be directly connected in the contact part.

The contact part may include a bridge electrode to connect the lower wiring and the upper wiring.

The gate driver may further include: k number of first bridge wirings to connect the k number of clock wirings to the plurality of stages; and k number of second bridge wirings to connect the k number of clock bar wirings to the plurality of stages.

A first one of the k number of clock wirings to receive a first clock signal may be disposed adjacent to a first one of the k number of clock bar wirings, to receive a first clock bar signal having a phase inverted with respect to a phase of the first clock signal.

The first clock bar wiring may be disposed between the first clock wiring and a second clock wiring to receive a second clock signal delayed from the first clock signal.

A first bridge wiring connected to the first clock wiring may be longer than a second bridge wiring connected to the first clock bar wiring, and a first bridge wiring connected to } the second clock wiring may be shorter than the second bridge wiring connected to the first clock bar wiring.

According to another aspect of the invention, a display apparatus including a display panel includes: a plurality of pixels to display an image; a gate driver to drive the pixels; a first part electrically connected to the pixels; and a second part electrically connected to the gate driver. The gate driver includes: a plurality of stages to generate a gate signal to be applied to the pixels; k number of clock wirings to apply k number of clock signals to the plurality of stages; and k number of clock bar wirings to apply k number of clock bar signals to the plurality of stages (where k is a natural number of one or greater), and the second part includes: k number of clock pads electrically connected to the k number of clock wirings, respectively; and k number of clock bar pads electrically connected to the k number of clock bar wirings, respectively. A first clock wiring of the k number of clock wirings to receive a first clock signal is disposed adjacent to a first clock bar wiring of the k number of clock bar wirings, to receive a first clock bar signal having a phase inverted with respect to a phase of the first clock signal, and a first clock pad electrically connected to the first clock wiring of the k number of clock pads is disposed adjacent to a second clock pad to receive a second clock signal delayed from the first clock signal.

The display apparatus may further include a flexible film coupled to one side of the display panel. The flexible film is electrically connected to the first part and the second part.

The first part may include a first pad part and the second part may include a second pad part and the display panel may further include an intermediate wiring part to connect the second pad part and the gate driver. The intermediate wiring part may further include: k number of first intermediate wirings to electrically connect the k number of clock pads to the k number of clock wirings, respectively; and k number of second intermediate wirings to electrically connect the k number of clock bar pads to the k number of clock bar wirings, respectively.

At least one of the k number of first intermediate wirings may intersect at least one of the k number of second intermediate wirings.

The k number of first intermediate wirings may be disposed on a first layer, and each of the k number of second intermediate wirings may include: a lower wiring disposed on the first layer; and an upper wiring disposed on a second layer different from the first layer.

At least one of the k number of first intermediate wirings may intersect the upper wiring of at least one of the k number of second intermediate wirings.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

DETAILED DESCRIPTION

Figure 1:
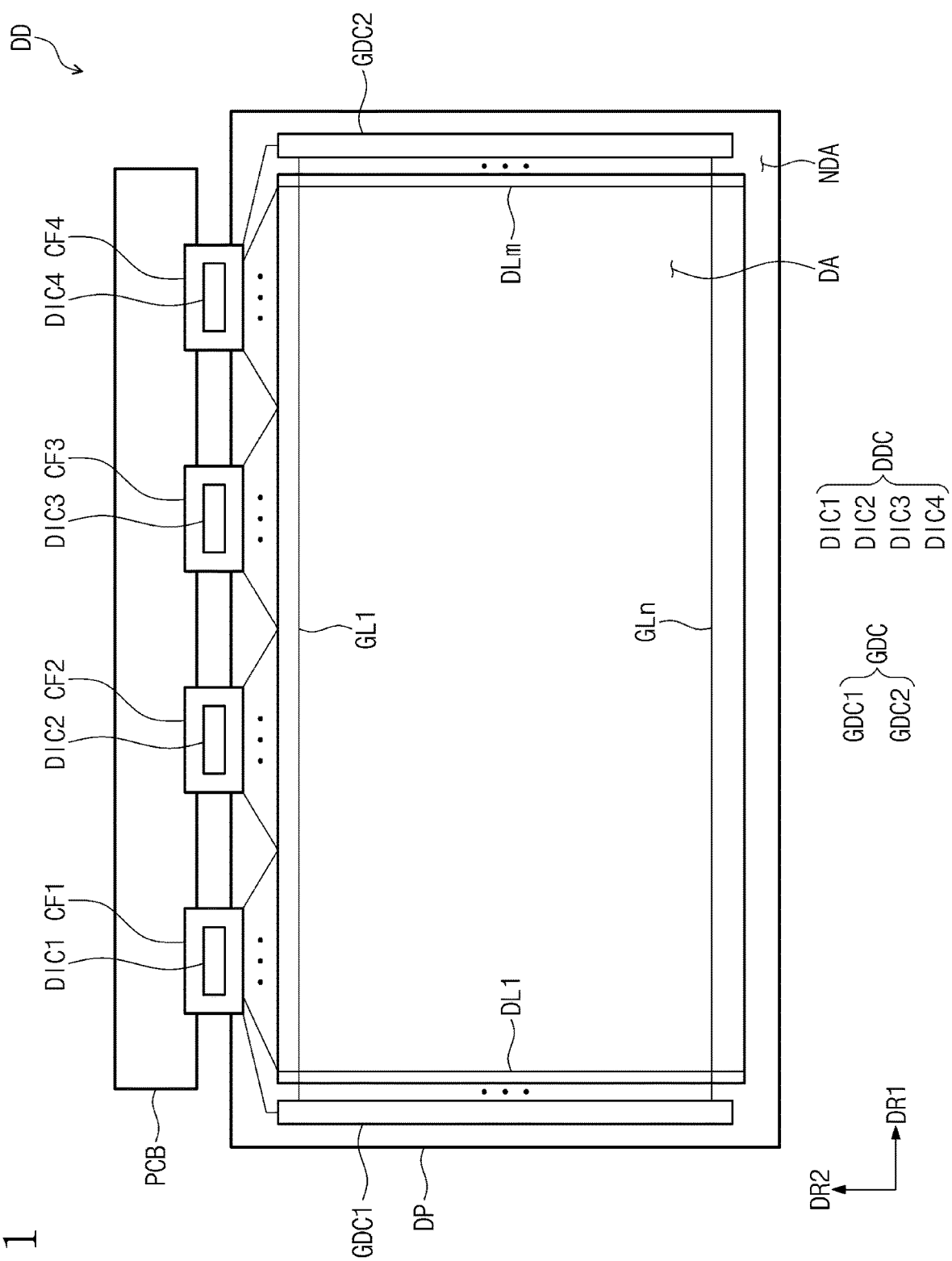
FIG. 1 is a plan view of an embodiment of a display apparatus constructed according to the principles of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2A:
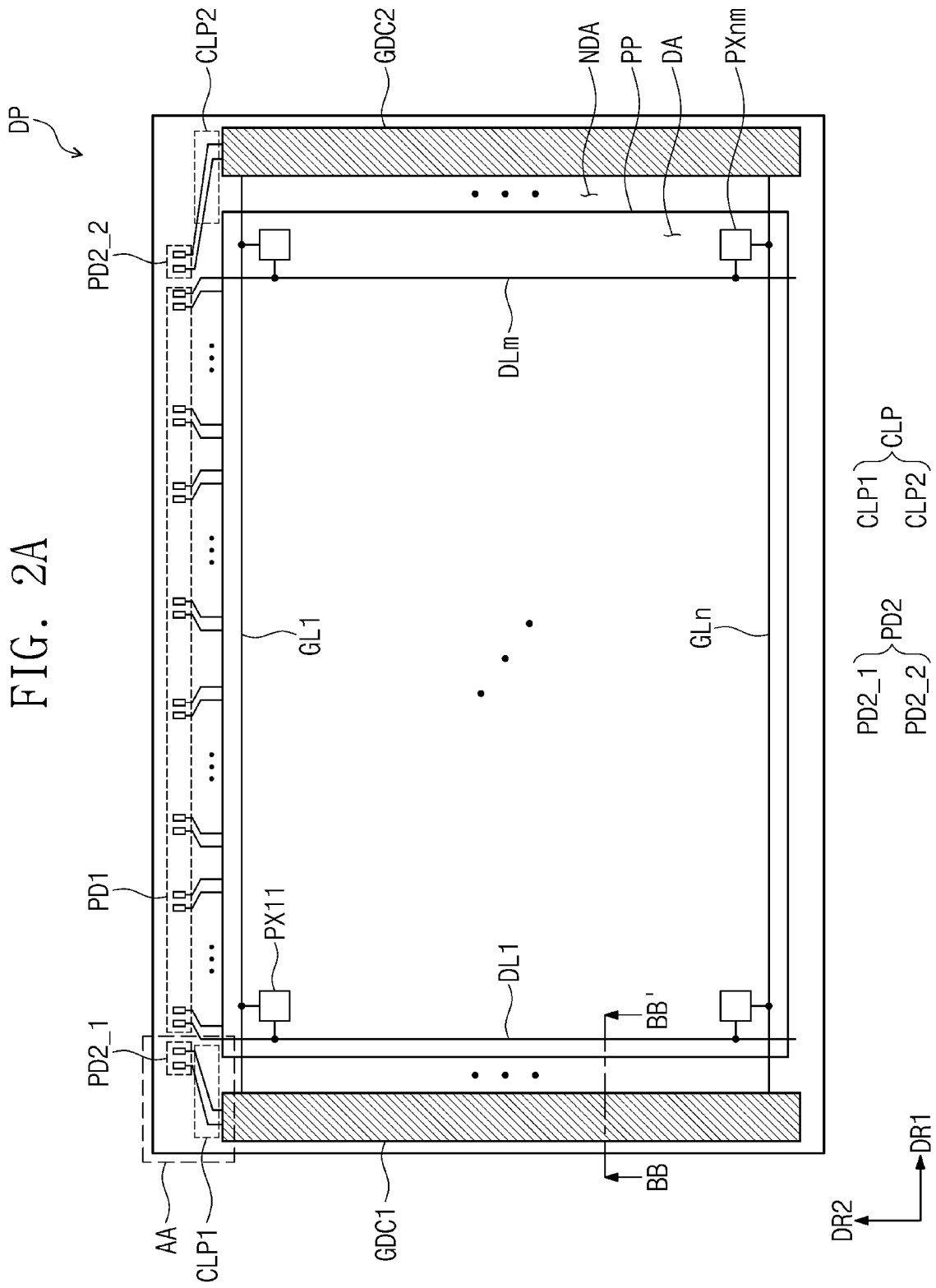
FIG. 2A is a plan view of a display panel shown in FIG. 1.
Figure 2B:
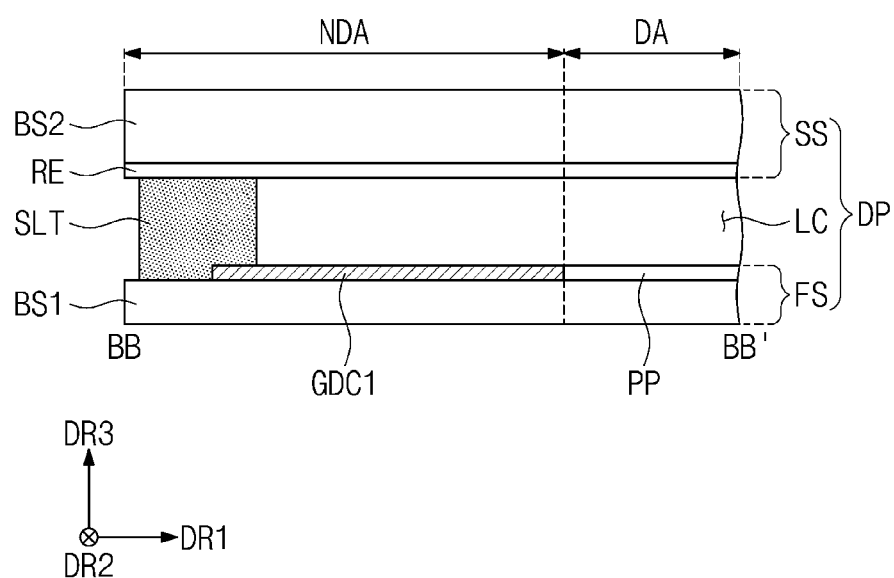
FIG. 2B is a cross-sectional view taken along line BB-BB' of FIG. 2A.

FIG. 1 is a plan view of an embodiment of a display apparatus constructed according to the principles of the invention. FIG. 2A is a plan view of a display panel shown in FIG. 1, and FIG. 2B is a cross-sectional view taken along line BB-BB' of FIG. 2A.

Referring to FIGS. 1 and 2A, a display apparatus DD includes a display panel DP for displaying an image and a panel driver for driving the display panel DP. The panel driver may include a gate driver GDC and a data driver DDC.

The display panel DP includes a display area DA displaying an image and a non-display area NDA adjacent to the display area DA. The display area DA is an area in which an image is substantially displayed, and the non-display area NDA is a bezel area in which an image is not displayed. Although FIG. 1 illustrates a structure in which the non-display area NDA is disposed to surround the display area DA, the embodiments are not limited thereto. The non-display area NDA may be disposed only on at least one side of the display area DA.

The display panel DP includes a plurality of gate lines GL1 to GLn, a plurality of data lines DL1 to DLm, and a plurality of pixels PX11 to PXnm. The plurality of gate lines GL1 to GLn extend in a first direction DR1 and are arranged in parallel with each other in a second direction DR2 crossing the first direction DR1. The second direction DR2 may be orthogonal to the first direction DR1. The plurality of data lines DL1 to DLm may be arranged in parallel in the first direction DR1 and may extend in the second direction DR2.

The plurality of pixels PX11 to PXnm may be arranged in the first and second directions DR1 and DR2 in the display area DA. The plurality of pixels PX11 to PXnm may be arranged in a matrix form. Each of the plurality of pixels PX11 to PXnm may be electrically connected to one of the plurality of gate lines GL1 to GLn and one of the plurality of data lines DL1 to DLm. Each of the pixels PX11 to PXnm is turned on by a gate signal applied from a corresponding one of the gate lines, and receives a data voltage from a corresponding one of the data lines to display an image of a desired gradation.

The gate driver GDC sequentially outputs gate signals to the gate lines GL1 to GLn. Accordingly, the plurality of pixels PX11 to PXnm may be sequentially scanned row by row by the gate signals. The gate driver GDC may include a first gate driver GDC1 and a second gate driver GDC2. The first gate driver GDC1 may be electrically connected to one ends of the gate lines GL1 to GLn, and the second gate driver GDC2 may be electrically connected to the other ends of the gate lines GL1 to GLn. Each of the first and second gate drivers GDC1 and GDC2 may include a shift register that sequentially outputs the gate signals. The first and second gate drivers GDC1 and GDC2 may operate simultaneously to output a gate signal to the same gate line at the same time. Accordingly, each of the gate lines GL1 to GLn may receive the gate signal from the first and second gate drivers GDC1 and GDC2 through both ends of the gate line.

FIGS. 1 and 2A illustrate a structure in which the two gate drivers GDC1 and GDC2 are electrically connected to both the ends, respectively, of the gate lines GL1 to GLn, but the embodiments are not limited thereto. That is, a structure may be employed in which only one of the first and second gate drivers GDC1 and GDC2 is electrically connected to the gate lines GL1 to GLn.

The first and second gate drivers GDC1 and GDC2 may be embedded in the display panel DP. In other words, the first and second gate drivers GDC1 and GDC2 may be formed in the non-display area NDA of the display panel DP through a thin film process in which the pixels PX11 to PXnm are formed in the display area DA of the display panel DP.

The data driver DDC converts image signals into data voltages and applies the data voltages to the data lines DL1 to DLm of the display panel DP. The data driver DDC may include a plurality of data driving chips DIC1 to DIC4. Each of the plurality of data driving chips DIC1 to DIC4 is electrically connected to corresponding data lines of the data lines DL1 to DLm. Although the four data driving chips DIC1 to DIC4 are illustrated in FIG. 1, the number of the data driving chips DIC1 to DIC4 is not particularly limited and may be variously changed.

The display apparatus DD may further include a plurality of flexible films CF1 to CF4 and a printed circuit board PCB. The plurality of flexible films CF1 to CF4 may be provided between the display panel DP and the printed circuit board PCB, and may electrically connect the display panel DP and the printed circuit board PCB. One end of each of the flexible films CF1 to CF4 is coupled to the display panel DP, and the other end of each of the flexible films CF1 to CF4 is coupled to the printed circuit board PCB.

In FIG. 1, a structure is illustrated in which the data driving chips DIC1 to DIC4 are respectively mounted on the flexible films CF1 to CF4, but the embodiments are not limited thereto. That is, the data driving chips DIC1 to DIC4 may be mounted directly on the display panel DP in a chip on glass (COG) method.

Various circuits for generating various control signals and power signals necessary to drive the display panel DP and the panel driver may be provided on the printed circuit board PCB.

Referring to FIG. 2A, the display panel DP may further include first and second parts in the form of a first pad part PD1 and a second pad part PD2, respectively. The first and second pad parts PD1 and PD2 are disposed in the non-display area NDA. The first pad part PD1 may include a plurality of data pads electrically connected to the data lines DL1 to DLm which connect with the pixels PX11 to PXnm. The first pad part PD1 may be coupled to the flexible films CF1 to CF4 to receive the data voltages from the data driving chips DIC1 to DIC4 mounted on the flexible films CF1 to CF4.

The second pad part PD2 includes a first driving pad part PD2_1 electrically connected to the first gate driver GDC1 and a second driving pad part PD2_2 electrically connected to the second gate driver GDC2. The first driving pad part PD2_1 includes a plurality of first driving pads for providing a first gate driving signal to the first gate driver GDC1, and the second driving pad part PD2_2 includes a plurality of second driving pads for providing a second gate driving signal to the second gate driver GDC2.

The second pad part PD2 may be connected to some of the flexible films CF1 to CF4. The first driving pad part PD2_1 is connected to a first flexible film CF1 among the flexible films CF1 to CF4, and the second driving pad part PD2_2 is connected to a fourth flexible film CF4 among the flexible films CF1 to CF4. The first gate driving signal may be a signal outputted from a first data driving chip DIC1 mounted on the first flexible film CF1, or a signal provided from the printed circuit board PCB. The second gate driving signal may be a signal outputted from a fourth data driving chip DIC4 mounted on the fourth flexible film CF4, or a signal provided from the printed circuit board PCB.

The display panel DP further includes an intermediate wiring part CLP that electrically connects the second pad part PD2 to the gate driver GDC. The intermediate wiring part CLP may include a first intermediate wiring part CLP1 and a second intermediate wiring part CLP2. The first intermediate wiring part CLP1 electrically connects the first driving pad part PD2_1 to the first gate driver GDC1, and the second intermediate wiring part CLP2 electrically connects the second driving pad part PD2_2 to the second gate driver GDC2.

The second pad part PD2 and the intermediate wiring part CLP will be described in detail later with reference to FIGS. 5 to 12.

A backlight unit for providing light to the display panel DP may further be included in the display apparatus DD. In the case that the display panel DP is a liquid crystal display panel which does not emit light on its own, the backlight unit may be disposed on a rear surface of the liquid crystal display panel to provide light to the liquid crystal display panel. Each of the pixels PX11 to PXnm may display an image having a desired gradation by adjusting the degree of transmission of the light provided from the backlight unit.

Referring to FIGS. 2A and 2B, the display panel DP includes a first display substrate FS, a second display substrate SS, and a liquid crystal layer LC. The first display substrate FS includes a first base substrate BS1 and a pixel layer PP disposed on the first base substrate BS1. The pixel layer PP may include a thin film transistor, a pixel electrode, and a plurality of insulating layers constituting each of the pixels PX11 to PXnm. The pixel layer PP may be provided in correspondence with the display area DA of the display panel DP. The first and second gate drivers GDC1 and GDC2 are disposed on the first base substrate BS1 in correspondence with the non-display area NDA.

The second display substrate SS includes a second base substrate BS2 and a reference electrode RE. The second base substrate BS2 is disposed to face the first base substrate BS1. The liquid crystal layer LC is interposed between the first and second display substrates FS and SS. The reference electrode RE is disposed on the second base substrate BS2 so as to face the pixel electrode with the liquid crystal layer LC interposed between the first and second display substrates FS and SS. A reference voltage is provided to the reference electrode RE. The reference electrode RE may be disposed on the entirety of a rear surface of the second base substrate BS2. Accordingly, the reference electrode RE may face the first and second gate drivers GDC1 and GDC2 in the non-display area NDA. The second display substrate SS may further include a color filter layer and a black matrix layer.

The display panel DP further includes a sealant SLT disposed in the non-display area NDA to couple the first and second display substrates FS and SS. The space between the first and second display substrates FS and SS may be sealed by the sealant SLT. The first and second gate drivers GDC1 and GDC2 may overlap the sealant SLT.

Figure 3A:
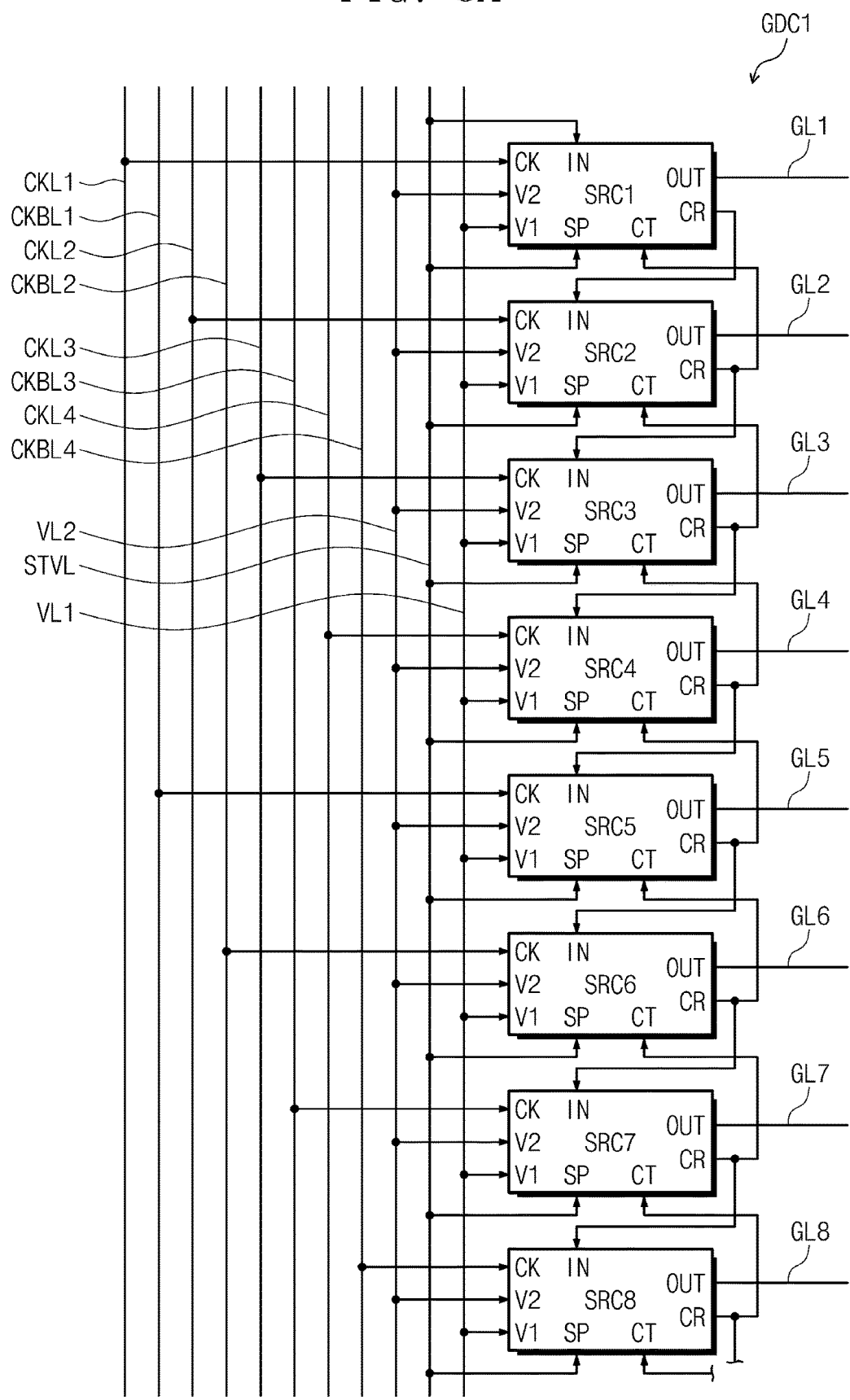
FIG. 3A is a block diagram of a first gate driver shown in FIG. 1.
Figure 3B:
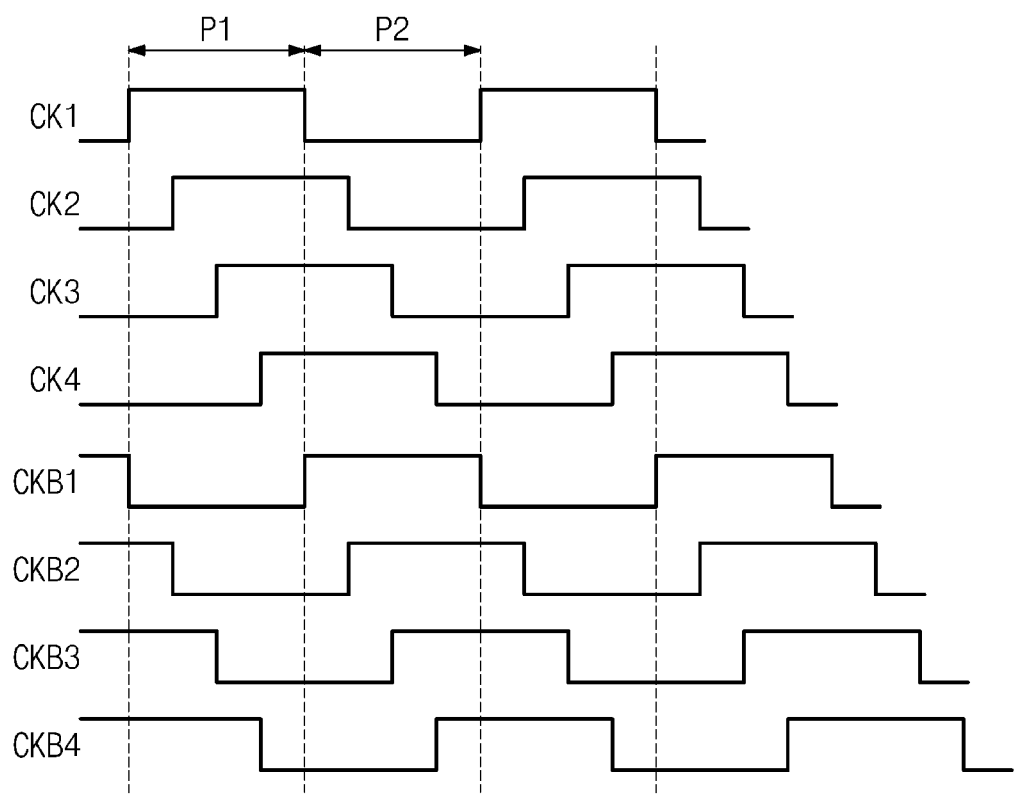
FIG. 3B is a waveform diagram of first to fourth clock signals and first to fourth clock bar signals applied to the first gate driver of FIG. 3A.
Figure 4:
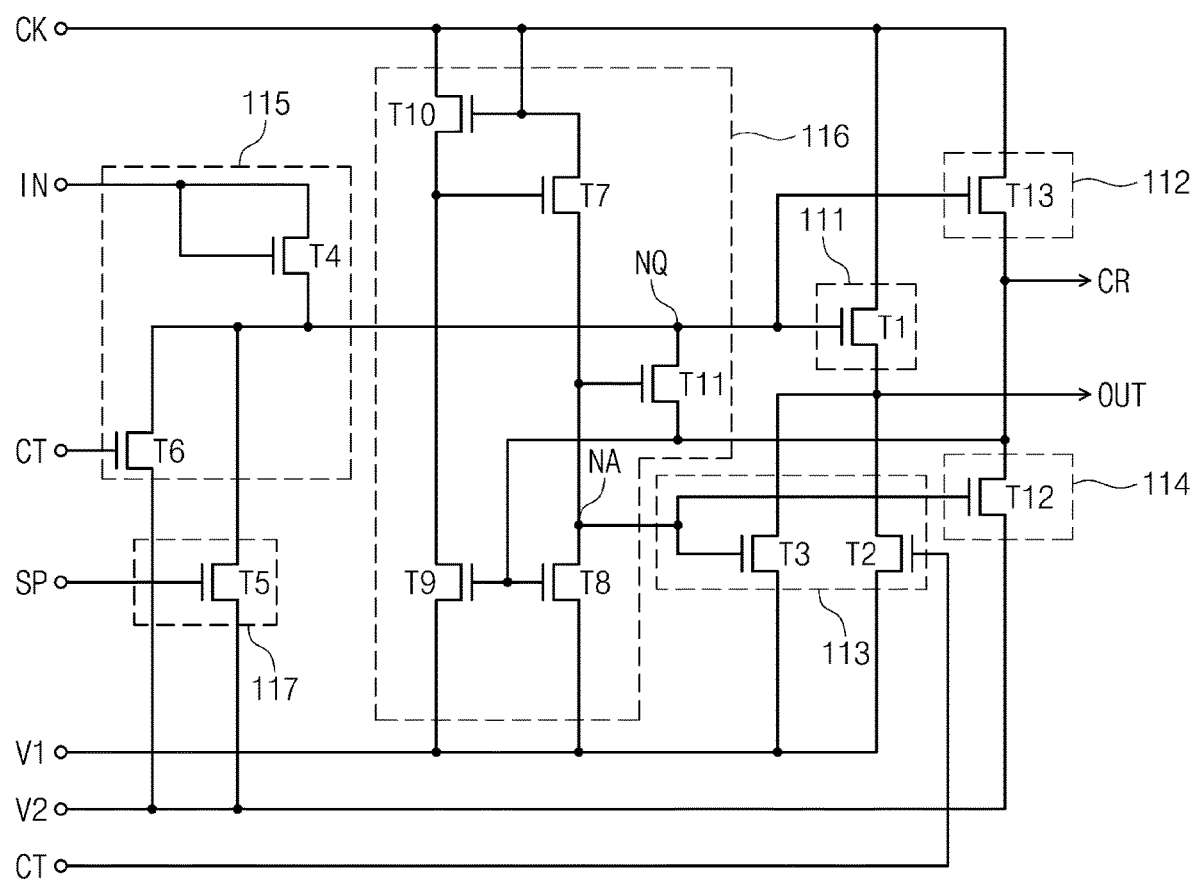
FIG. 4 is a circuit diagram of an embodiment of the first stage of FIG. 3A.

FIG. 3A is a block diagram of a first gate driver shown in FIG. 1, and FIG. 3B is a waveform diagram of first to fourth clock signals and first to fourth clock bar signals applied to the first gate driver of FIG. 3A. FIG. 4 is a circuit diagram of an embodiment of the first stage of FIG. 3A.

Although the block diagram of the first gate driver GDC1 is illustrated in FIG. 3A, the second gate driver GDC2 has a configuration similar to that of the first gate driver GDC1. Accordingly, the configuration of the first gate driver GDC1 is described with reference to FIG. 3A, and a description of the configuration of the second gate driver GDC2 will be omitted to avoid redundancy.

Referring to FIG. 3A, the first gate driver GDC1 may include a plurality of stages dependently connected to each other. The stages may be electrically connected to the gate lines GL1 to GLn (illustrated in FIG. 2A), respectively. The plurality of stages may respectively output the gate signals to the gate lines GL1 to GLn.

Hereinafter, first to eighth stages SRC1 to SRC8 among the plurality of stages are exemplarily illustrated in FIG. 3A. Although the first to eighth stages SRC1 to SRC8 are illustrated, additional stages may also be provided in substantially the same configuration.

Each of the first to eighth stages SRC1 to SRC8 (hereinafter referred to as stages SRC1 to SRC8) includes an input terminal IN, a control terminal CT, a clock terminal CK, a first voltage terminal V1, a second voltage terminal V2, a reset terminal SP, an output terminal OUT, and a carry terminal CR.

The carry terminal CR of each of the stages SRC1 to SRC8 is electrically connected to an input terminal IN of a next stage. An i-th stage may output an i-th carry signal through the carry terminal CR. Here, i is defined as a natural number. The input terminal IN of the first stage SRC1 receives, instead of a carry signal of a previous stage, a vertical start signal STV that starts the driving of the gate driver GDC1 through a start signal wiring STVL. The input terminal IN of each of the stages SRC2 to SRC8 after the first stage SRC1 receives a carry signal of a previous stage. The input terminal IN of the i-th stage is electrically connected to the carry terminal CR of an (i−1)-th stage. For example, the input terminal IN of the second stage SRC2 receives a carry signal of the first stage SRC1, and the input terminal IN of the third stage SRC3 receives a carry signal of the second stage SRC2.

This configuration is only an example, and the input terminal IN of the i-th stage may also be electrically connected to a carry terminal of a previous stage, for example, a carry terminal of the (i−1)-th stage, an (i−2)-th stage, an (i−3)-th stage, or the like.

The control terminal CT of the i-th stage is electrically connected to the carry terminal CR of an (i+1)-th stage, and receives a carry signal of the (i+1)-th stage. For example, the control terminal CT of the first stage SRC1 receives the carry signal of the second stage SRC2, and the control terminal CT of the second stage SRC2 receives a carry signal of the third stage SRC3.

The clock terminal CK of the i-th stage receives a corresponding signal among a plurality of clock signals and a plurality of clock bar signals through a plurality of clock wirings (e.g., first to fourth clock wirings CKL1 to CKL4), and a plurality of clock bar wirings (e.g., first to fourth clock bar wirings CKBL1 to CKBL4). The plurality of clock signals may be first to fourth clock signals CK1 to CK4, and the plurality of clock bar signals may be first to fourth clock bar signals CKB1 to CKB4. However, the number of the plurality of clock signals CK1 to CK4 and the number of the plurality of clock bar signals CKB1 to CKB4 are not limited thereto, and may have various values.

Specifically, referring to FIG. 3B, a first period P1 may be a period in which the level of each of the first to fourth clock signals CK1 to CK4 becomes a high voltage, and a second period P2 may be a period in which the level of each of the first to fourth clock signals CK1 to CK4 becomes a low voltage. Also, the first period P1 may be a period in which the level of each of the first to fourth clock bar signals CKB1 to CKB4 becomes a low voltage, and the second period P2 may be a period in which the level of each of the first to fourth clock bar signals CKB1 to CKB4 becomes a high voltage. That is, the first clock signal CK1 and the first clock bar signal CKB1 have a phase difference of about 180 degrees, and the second clock signal CK2 and the second clock bar signal CKB2 have a phase difference of about 180 degrees. The third clock signal CK3 and the third clock bar signal CKB3 have a phase difference of about 180 degrees, and the fourth clock signal CK4 and the fourth clock bar signal CKB4 have a phase difference of about 180 degrees. Periods during which the first to fourth clock signals CK1 to CK4 are respectively at the high voltage may overlap each other, and periods during which the first to fourth clock bar signals CKB1 to CKB4 are respectively at the high voltage may overlap each other.

According to an embodiment, the first to fourth clock signals CK1 to CK4 are respectively provided to the clock terminals CK of the first to fourth stages SRC1 to SRC4. Accordingly, the first to fourth stages SRC1 to SRC4 sequentially output first to fourth gate signals to the output terminals OUT thereof in response to the first to fourth clock signals CK1 to CK4. The output terminals OUT of the first to fourth stages SRC1 to SRC4 are respectively connected to first to fourth gate lines GL1 to GL4. Thereafter, the first to fourth clock bar signals CKB1 to CKB4 are respectively provided to the clock terminals CK of the fifth to eighth stages SRC5 to SRC8. Accordingly, the fifth to eighth stages SRC5 to SRC8 sequentially output fifth to eighth gate signals to the output terminals OUT thereof in response to the first to fourth clock bar signals CKB1 to CKB4. The output terminals OUT of the fifth to eighth stages SRC5 to SRC8 are respectively connected to fifth to eighth gate lines GL5 to GL8.

The above-described operation method may be repeatedly performed in units of eight stages. When the number of the clock signals is k and the number of the clock bar signals is k, the operation may be repeatedly performed in units of 2k number of stages. Here, k may be a natural number of one or greater.

The first gate driver GDC1 includes a plurality of clock wirings and a plurality of clock bar wirings. The plurality of clock signals are respectively provided to corresponding stages among the plurality of stages through the plurality of clock wirings. The plurality of clock wirings may be four clock wirings (hereinafter referred to as first to fourth clock wirings CKL1 to CKL4), and the plurality of clock bar wirings may be four clock bar wirings (hereinafter referred to as first to fourth clock bar wirings CKBL1 to CKBL4). The first to fourth clock signals CK1 to CK4 are respectively provided to the first to fourth stages SRC1 to SRC4 through the first to fourth clock wirings CKL1 to CKL4. The first to fourth clock bar signals CKB1 to CKB4 are respectively provided to the fifth to eighth stages SRC5 to SRC8 through the first to fourth clock bar wirings CKBL1 to CKBL4. When the number of the clock signals is k and the number of the clock bar signals is k, the first gate driver GDC1 includes k number of clock wirings and k number of clock bar wirings.

A first discharge voltage is supplied to the first voltage terminal V1 of each of the stages SRC1 to SRC8 through a first voltage wiring VL1, and a second discharge voltage is supplied to the second voltage terminal V2 of each of the stages SRC1 to SRC8 through a second voltage wiring VL2. For example, the first discharge voltage and the second discharge voltage may be supplied at a level lower than a ground voltage.

For example, the level of the first discharge voltage may be higher than the level of the second discharge voltage. The first discharge voltage may be set to about −10 V to about −5 V, and the second discharge voltage may be set to about −16 V to about −10 V. As another example, the first discharge voltage and the second discharge voltage may have substantially the same voltage level.

The first gate driver GDC1 further includes first and second voltage wirings VL1 and VL2. The first discharge voltage is supplied to the stages SRC1 to SRC8 through the first voltage wiring VL1, and the second discharge voltage is supplied to the stages SRC1 to SRC8 through the second voltage wiring VL2. The number of the discharge voltages supplied to each of the stages SRC1 to SRC8 is not limited thereto. That is, only one of the first and second discharge voltages may be supplied to each of the stages SRC1 to SRC8, or a third discharge voltage may further be supplied in addition to the first and second discharge voltages.

A reset signal may be provided to the reset terminal SP of each of the stages SRC1 to SRC8. The reset signal may be the vertical start signal STV. The vertical start signal STV is provided to the reset terminals SP of the stages SRC1 to SRC8 through a start signal wiring STVL. For example, in one frame period, the vertical start signal STV has a low state in a period other than a period in which the first gate line GL1 operates. Accordingly, the stages may be reset in a period in which the first stage SRC1 operates. However, the reset period of the stages is not limited thereto. In other words, when a separate reset signal different from the vertical start signal is provided to the reset terminal SP, the reset period of the stages may change.

Referring to FIG. 4, the first stage SRC1 includes a first output unit 111, a second output unit 112, a first discharge unit 113, a second discharge unit 114, a control unit 115, a switching unit 116, and a reset unit 117. Although the circuit configuration of the first stage SRC1 among the plurality of stages is illustrated in FIG. 4, the other stages also have the same circuit configuration as the first stage SRC1.

The first output unit 111 is electrically connected to the output terminal OUT and outputs the first gate signal through the output terminal OUT. The second output unit 112 is electrically connected to the carry terminal CR and outputs a first carry signal through the carry terminal CR. The first gate signal is applied to the first gate line, and the first carry signal is provided to a next stage (i.e., the second stage SRC2). The first output unit 111 may include a first output transistor T1 electrically connected to the clock terminal CK, a first node NQ, and the output terminal OUT. The second output unit 112 may include a second output transistor T13 electrically connected to the clock terminal CK, the first node NQ, and the carry terminal CR.

The control unit 115 controls operations of the first output unit 111 and the second output unit 112. The control unit 115 turns on the first output unit 111 and the second output unit 112 in response to an input signal provided to the input terminal IN, and turns off the first output unit 111 and the second output unit 112 in response to a control signal provided to the control terminal CT. Here, the input signal may be a carry signal provided from a previous stage or the vertical start signal. The control signal may be a carry signal provided from a next stage. The control unit 115 includes a first control transistor T4 and a second control transistor T6. The first control transistor T4 is electrically connected to the input terminal IN and the first node NQ, and the second control transistor T6 is electrically connected to the control terminal CT, the first node NQ, and the second voltage terminal V2. The second control transistor T6 may lower the potential of the first node NQ to the second discharge voltage in response to the control signal.

The first discharge unit 113 lowers the potential of the output terminal OUT to the first discharge voltage, and the second discharge unit 114 lowers the potential of the carry terminal CR to the second discharge voltage. The first discharge unit 113 includes first and second discharge transistors T2 and T3. The first discharge transistor T2 is electrically connected to the control terminal CT, the output terminal OUT, and the first voltage terminal V1, and the second discharge transistor T3 is electrically connected to a second node NA, the output terminal OUT, and the first voltage terminal V1. The second discharge unit 114 includes a third discharge transistor T12 electrically connected to the second node NA, the carry terminal CR, and the second voltage terminal V2.

The switching unit 116 controls the operations of the first and second discharge units 113 and 114. The switching unit 116 provides the second node NA with a switching signal for turning on and off the first and second discharge units 113 and 114. The switching unit 116 includes first to fourth switching transistors T10, T7, T9 and T8.

The reset unit 117 may reset the voltage level of the first node NQ to the second discharge voltage. The reset unit 117 may include a reset transistor T5 electrically connected to the reset terminal SP, the first node NQ, and the second voltage terminal V2. The signal applied to the reset terminal SP may be the vertical start signal.

The circuit configuration of each of the plurality of stages is not limited to the circuit configuration illustrated in FIG. 4 and may be variously changed.

Figure 5:
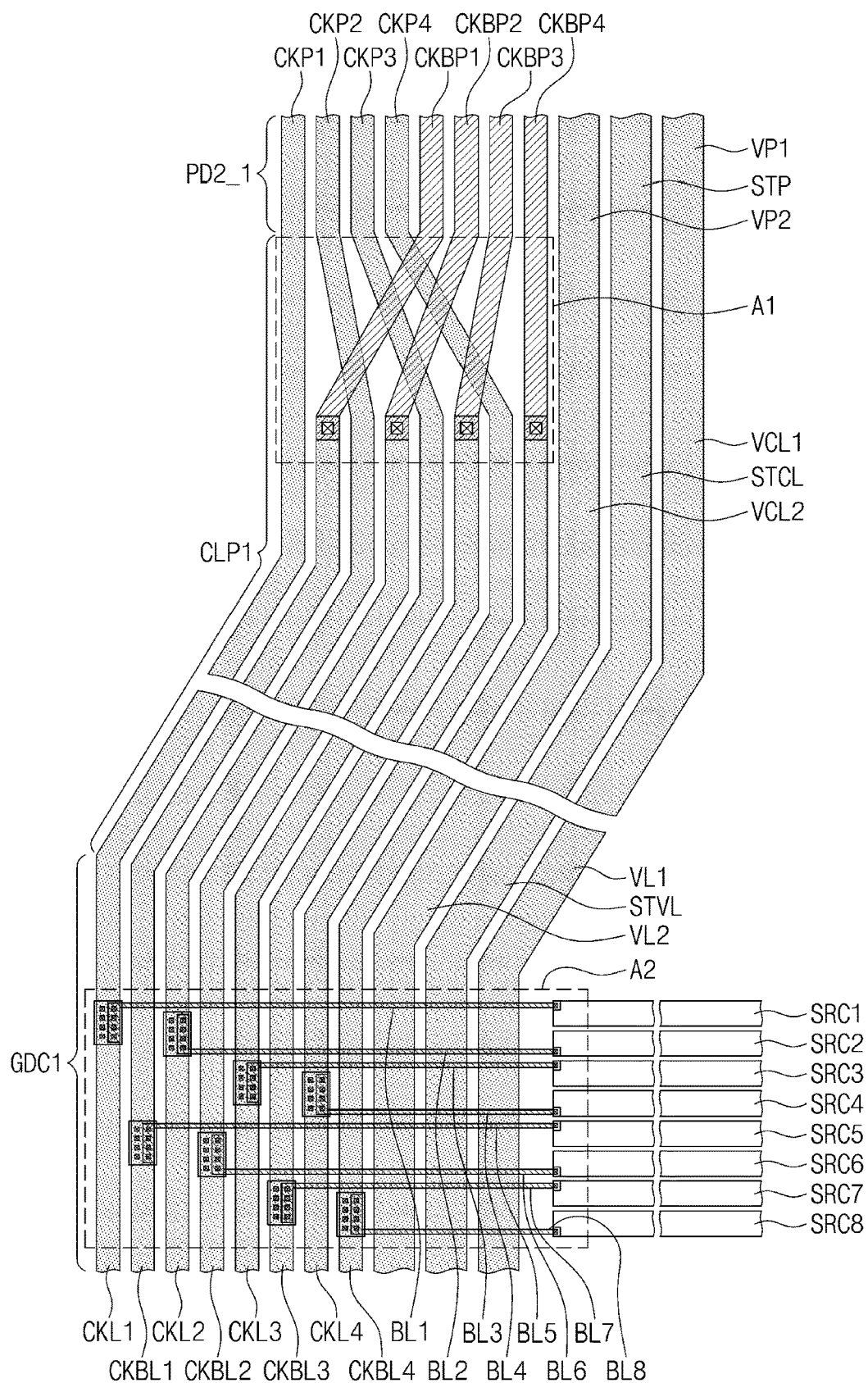
FIG. 5 is an enlarged plan view of a first embodiment of the part AA shown in FIG. 2A.
Figure 6A:
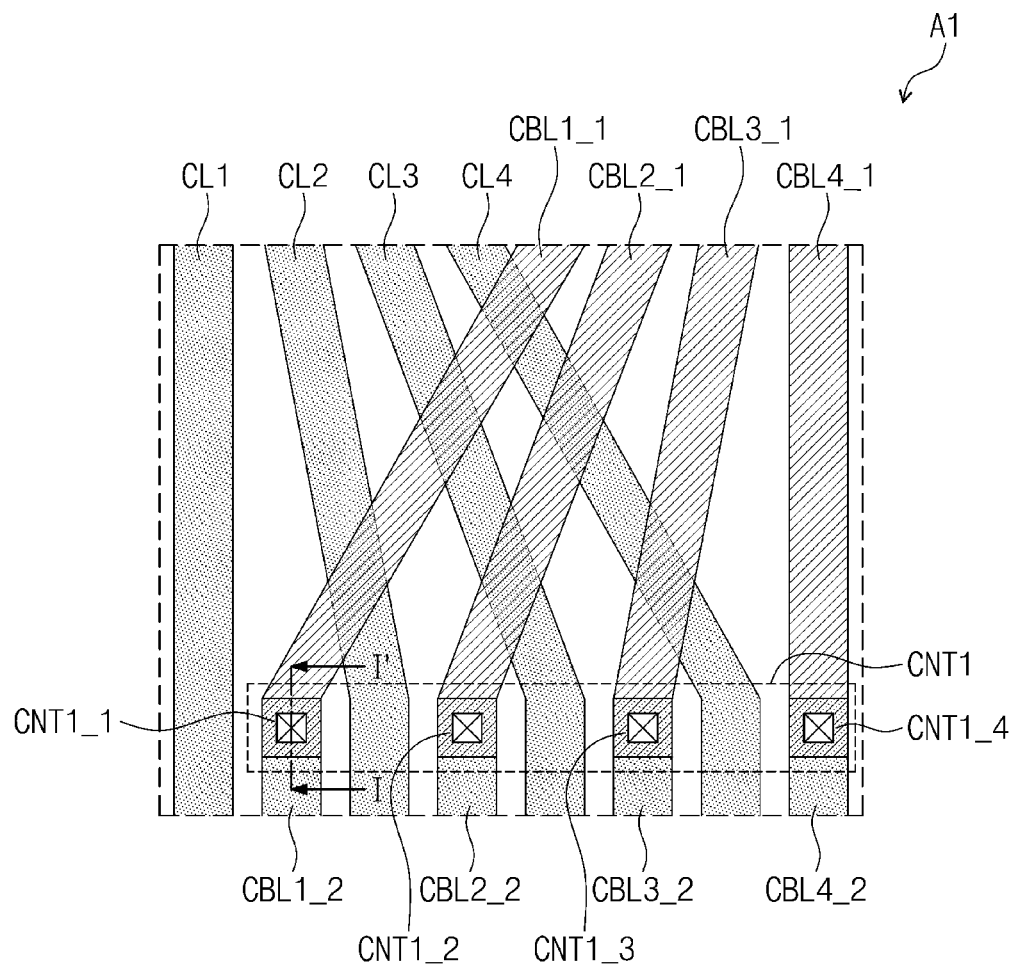
FIG. 6A is an enlarged view of the portion A1 of FIG. 5.
Figure 6B:
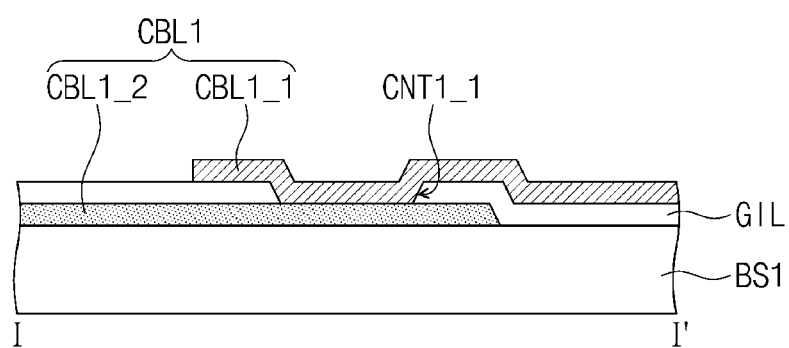
FIG. 6B is a cross-sectional view taken along line I-I' of FIG. 6A.
Figure 6C:
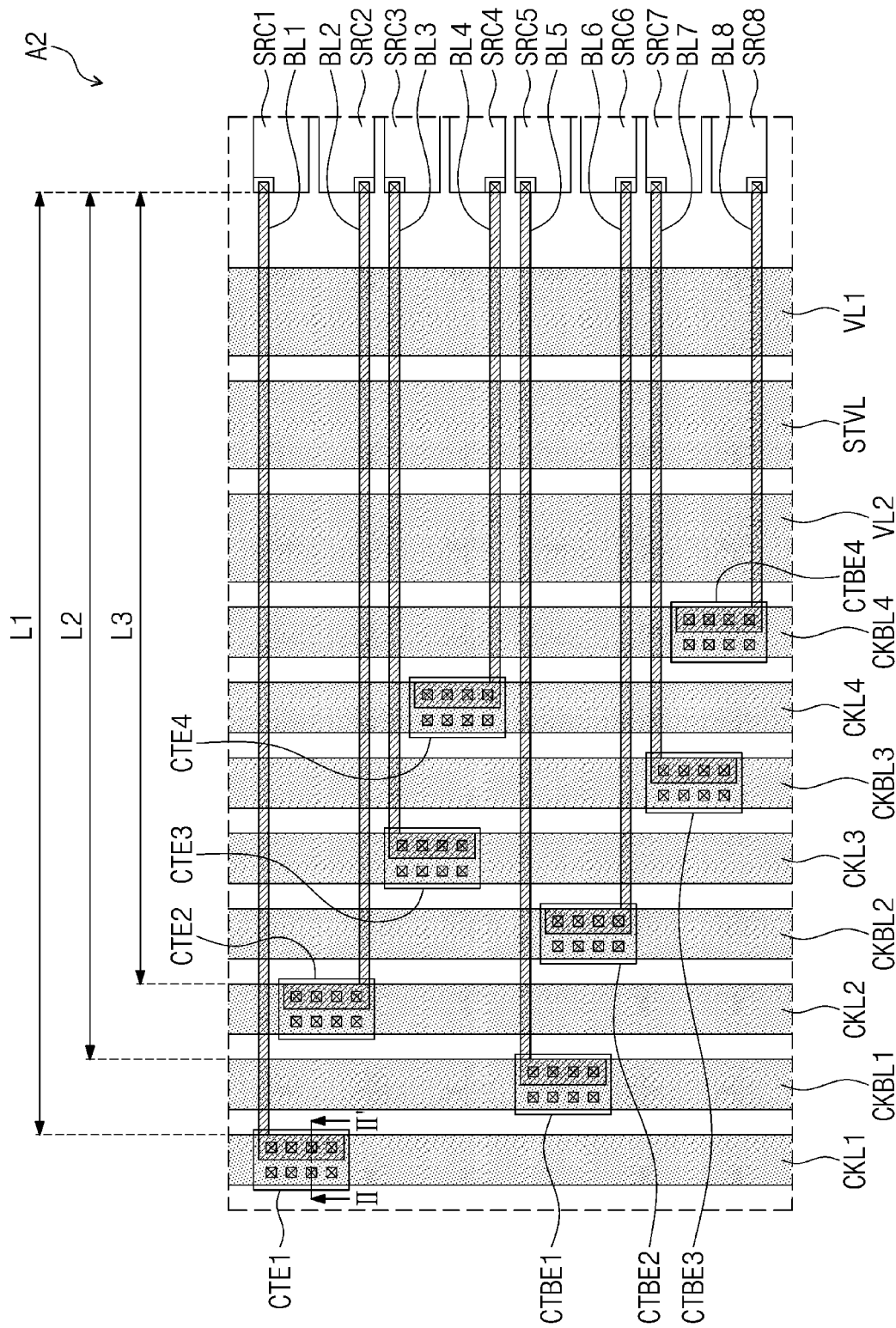
FIG. 6C is an enlarged plan view of the portion A2 of FIG. 5.
Figure 6D:
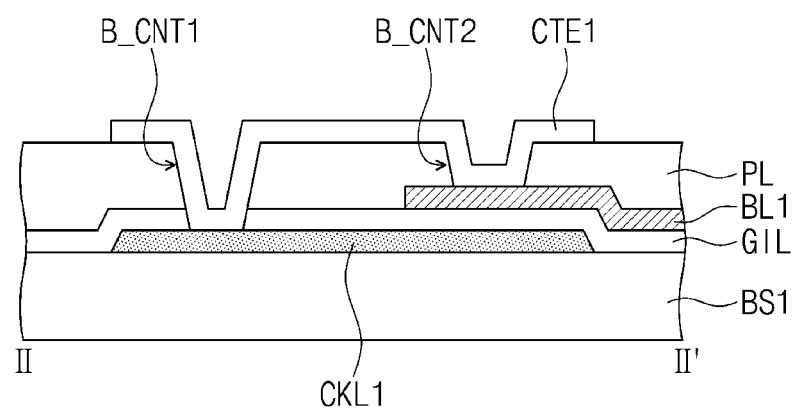
FIG. 6D is a cross-sectional view taken along line II-II' of FIG. 6C.

FIG. 5 is an enlarged plan view of a first embodiment of the part AA shown in FIG. 2A. FIG. 6A is an enlarged view of the portion A1 of FIG. 5, and FIG. 6B is a cross-sectional view taken along line I-I' of FIG. 6A. FIG. 6C is an enlarged plan view of the portion A2 of FIG. 5, and FIG. 6D is a cross-sectional view taken along line of FIG. 6C.

Referring to FIGS. 2A, 5 and 6A, the first gate driver GDC1 includes the plurality of stages and a plurality of signal wirings disposed adjacent to the plurality of stages. The plurality of signal wirings may include the plurality of clock wirings, the plurality of clock bar wirings, the first and second voltage wirings VL1 and VL2, and the start signal wiring STVL. The plurality of clock wirings may be the first to fourth clock wirings CKL1 to CKL4, and the plurality of clock bar wirings may be the first to fourth clock bar wirings CKBL1 to CKBL4.

As shown in FIG. 5, the first clock wiring CKL1 and the first clock bar wiring CKBL1 are disposed adjacent to each other, and the second clock wiring CKL2 and the second clock bar wiring CKBL2 are disposed adjacent to each other. In addition, the third clock wiring CKL3 and the third clock bar wiring CKBL3 are disposed adjacent to each other, and the fourth clock wiring CKL4 and the fourth clock bar wiring CKBL4 are disposed adjacent to each other. The plurality of clock wirings and the plurality of clock bar wirings may be arranged in a first order. Here, the first order refers to an order in which the first clock wiring CKL1, the first clock bar wiring CKBL1, the second clock wiring CKL2, the second clock bar wiring CKBL2, the third clock wiring CKL3, the third clock bar wiring CKBL3, the fourth clock wiring CKL4, and the fourth clock bar wiring CKBL4 are sequentially arranged. When k number of clock wirings and k number of clock bar wirings are provided, the first order may be an order in which the k number of clock wirings and the k number of clock bar wirings are alternately arranged.

The first to fourth clock wirings CKL1 to CKL4 and the first to fourth clock bar wirings CKBL1 to CKBL4 may be disposed on the same layer and may be formed of the same material. The first to fourth clock wirings CKL1 to CKL4 and the first to fourth clock bar wirings CKBL1 to CKBL4 may be formed of a first metal material.

The plurality of signal wirings receives the first gate driving signal from the outside through the first driving pad part PD2_1 shown in FIG. 2A. The first driving pad part PD2_1 may include a plurality of clock pads, a plurality of clock bar pads, first and second voltage pads VP1 and VP2 shown in FIG. 5, and a start signal pad STP shown in FIG. 5. For example, referring to FIG. 5, the plurality of clock pads may be first to fourth clock pads CKP1 to CKP4, and the plurality of clock bar pads may be first to fourth clock bar pads CKBP1 to CKBP4.

The first to fourth clock pads CKP1 to CKP4 are disposed adjacent to each other as shown in FIG. 5. The first and second clock pads CKP1 and CKP2 are adjacent to each other, the second and third clock pads CKP2 and CKP3 are adjacent to each other, and the third and fourth clock pads CKP3 and CKP4 are adjacent to each other. The first to fourth clock bar pads CKBP1 to CKBP4 are disposed adjacent to each other. The first and second clock bar pads CKBP1 and CKBP2 are adjacent to each other, the second and third clock bar pads CKBP2 and CKBP3 are adjacent to each other, and the third and fourth clock bar pads CKBP3 and CKBP4 are adjacent to each other. That is, the plurality of clock pads and the plurality of clock bar pads may be arranged in a second order different from the first order. Here, the second order refers to an order in which the first clock pad CKP1, the second clock pad CKP2, the third clock pad CKP3, the fourth clock pad CKP4, the first clock bar pad CKBP1, the second clock bar pad CKBP2, the third clock bar pad CKBP3, and the fourth clock bar pad CKBP4 are sequentially arranged. When k number of clock pads and k number of clock bar pads are provided, the second order may be an order in which the k number of clock pads are arranged and then the k number of clock bar pads are arranged. The k number of clock pads and the k number of clock bar pads may not be alternately arranged.

The first to fourth clock pads CKP1 to CKP4 are disposed on a first layer, and the first to fourth clock bar pads CKBP1 to CKBP4 are disposed on a second layer. Here, the first layer may be the first base substrate BS1 shown in FIG. 6B and the second layer may be a gate insulating layer GIL shown in FIG. 6B. The first to fourth clock pads CKP1 to CKP4 may be formed of the first metal material, and the first to fourth clock bar pads CKBP1 to CKBP4 may be formed of a second metal material. The first and second metal materials may be the same material or materials different from each other.

Referring to FIGS. 2A and 5, the first intermediate wiring part CLP1 is disposed between the first driving pad part PD2_1 and the first gate driver GDC1, and electrically connects the first driving pad part PD2_1 to the signal wirings of the first gate driver GDC1. Specifically, as shown in FIGS. 5 and 6A, the first intermediate wiring part CLP1 may include a plurality of clock intermediate wirings CL1 to CL4, a plurality of clock bar intermediate wirings CBL1 to CBL4, first and second voltage intermediate wirings VCL1 and VCL2, and a start signal intermediate wiring STCL. Referring to FIG. 6A, the plurality of clock intermediate wirings may be first to fourth clock intermediate wirings CL1 to CL4, and the plurality of clock bar intermediate wirings may be first to fourth clock bar intermediate wirings CBL1 to CBL4.

The first to fourth clock intermediate wirings CL1 to CL4 electrically connect the first to fourth clock wirings CKL1 to CKL4 and the first to fourth clock pads CKP1 to CKP4. The first to fourth clock intermediate wirings CL1 to CL4 are disposed on a layer the same as that on which the first to fourth clock wirings CKL1 to CKL4 are disposed. The first to fourth clock intermediate wirings CL1 to CL4 may be integrally formed with the first to fourth clock wirings CKL1 to CKL4. The first to fourth clock intermediate wirings CL1 to CL4 and the first to fourth clock wirings CKL1 to CKL4 may be formed of the first metal material.

The first to fourth clock bar intermediate wirings CBL1 to CBL4 connect the first to fourth clock bar wirings CKBL1 to CKBL4 and the first to fourth clock bar pads CKBP1 to CKBP4. Referring to FIG. 6A, the first clock bar intermediate wiring CBL1 includes a first upper wiring CBL1_1 and a first lower wiring CBL1_2. The second clock bar intermediate wiring CBL2 includes a second upper wiring CBL2_1 and a second lower wiring CBL2_2. The third clock bar intermediate wiring CBL3 includes a third upper wiring CBL3_1 and a third lower wiring CBL3_2. The fourth clock bar intermediate wiring CBL4 includes a fourth upper wiring CBL4_1 and a fourth lower wiring CBL4_2.

The first to fourth upper wirings CBL1_1 to CBL4_1 are disposed on a different layer from the layer on which the first to fourth lower wirings CBL1_2 to CBL4_2 are disposed. The first to fourth upper wirings CBL1_1 to CBL4_1 may be disposed on the second layer, and the first to fourth lower wirings CBL1_2 to CBL4_2 may be disposed on the first layer. Here, the first layer may be the first base substrate BS1, and the second layer may be the gate insulating layer GIL.

Referring to FIG. 6A, the first to fourth upper wirings CBL1_1 to CBL4_1 are electrically connected to the first to fourth lower wirings CBL1_2 to CBL4_2, respectively, through a first contact part CNT1. The first contact part CNT1 may include first to fourth contact holes CNT1_1 to CNT1_4. The first upper wiring CBL1_1 and the first lower wiring CBL1_2 are directly connected through the first contact hole CNT1_1, and the second upper wiring CBL2_1 and the second lower wiring CBL2_2 are directly connected through the second contact hole CNT1_2. The third upper wiring CBL3_1 and the third lower wiring CBL3_2 are directly connected through the third contact hole CNT1_3, and the fourth upper wiring CBL4_1 and the fourth lower wiring CBL4_2 are directly connected through the fourth contact hole CNT1_4.

As illustrated in FIG. 6B, the first lower wiring CBL1_2 is disposed on the first base substrate BS1 and is covered by the gate insulating layer GIL. The first contact hole CNT1_1 is provided in the gate insulating layer GIL to expose a portion of the first lower wiring CBL1_2. The first upper wiring CBL1_1 is disposed on the gate insulating layer GIL. The first upper wiring CBL1_1 partially overlaps the first lower wiring CBL1_2, and is directly connected, in a portion in which the first upper wiring CBL1_1 overlaps the first lower wiring CBL1_2, to the first lower wiring CBL1_2 through the first contact hole CNT1_1.

Although only the configuration of the first clock bar intermediate wiring CBL1 is illustrated in FIG. 6B, each of the second to fourth clock bar intermediate wirings CBL2 to CBL4 has the same configuration as the first clock bar intermediate wiring CBL1, and a repetitive description will be omitted to avoid redundancy.

Referring to FIG. 6A again, the first upper wiring CBL1_1 may cross the second to fourth clock intermediate wirings CL2 to CL4. The second upper wiring CBL2_1 may cross the third to fourth clock intermediate wirings CL3 and CL4, and the third upper wiring CBL3_1 may cross the fourth clock intermediate wiring CL4.

Referring to FIGS. 6C and 6D, the plurality of clock wirings and the plurality of clock bar wirings are electrically connected to the stages SRC1~SRC8 through a plurality of bridge wirings. The plurality of bridge wirings may include first to eighth bridge wirings BL1 to BL8. Referring to FIGS. 5 and 6C, the first to fourth bridge wirings BL1 to BL4 electrically connect the first to fourth clock wirings CKL1 to CKL4 to the first to fourth stages SRC1 to SRC4, respectively. The fifth to eighth bridge wirings BL5 to BL8 electrically connect the first to fourth clock bar wirings CKBL1 to CKBL4 to the fifth to eighth stages SRC5 to SRC8, respectively.

The first to eighth bridge wirings BL1 to BL8 are disposed on a different layer from the layer on which the first to fourth clock wirings CKL1 to CKL4 and the first to fourth clock bar wirings CKBL1 to CKBL4 are disposed. The first to fourth clock wirings CKL1 to CKL4 and the first to fourth clock bar wirings CKBL1 to CKBL4 are disposed on the first layer, and the first to eighth bridge wirings BL1 to BL8 are disposed on the second layer. The first layer may be the first base substrate BS1 and the second layer may be the gate insulating layer GIL.

Referring to FIGS. 5 and 6C, the first clock wiring CKL1 is disposed adjacent to the first clock bar wiring CKBL1. The first clock bar wiring CKBL1 may be disposed between the first clock wiring CKL1 and the second clock wiring CKL2. For example, as shown in FIG. 6C, The first clock wiring CKL1 is spaced apart from the first stage SRC1 at a first distance L1, and the first clock bar wiring CKBL1 is spaced apart from the fifth stage SRC5 at a second distance L2. The first distance L1 is greater than the second distance L2. The second clock wiring CKL2 may be spaced apart from the second stage SRC2 at a third distance L3. The third distance L3 may be smaller than the first and second distances L1 and L2. Accordingly, the length L1 of the first bridge wiring BL1 is longer than the lengths of the second and fifth bridge wirings BL2 and BL5, and the length L2 of the fifth bridge wiring BL5 is longer than the length L3 of the second bridge wiring BL2.

As the clock wirings and the clock bar wirings are alternately arranged as described above, the difference in length may decrease between bridge wirings connected to the clock wirings to which the clock signals are applied and bridge wirings connected to the clock bar wirings to which the clock bar signals are applied. In particular, the difference in length is reduced between the first and fifth bridge wirings BL1 and BL5 respectively connected to the first clock wiring CKL1 and the first clock bar wiring CKBL1 which are disposed on the outermost side. When the difference in length between the first and fifth bridge wirings BL1 and BL5 increases, the difference between a first parasitic capacitance formed between the first bridge wiring BL1 and the reference electrode and a second parasitic capacitance formed between the fifth bridge wiring BL5 and the reference electrode increases. As the difference between the first and second parasitic capacitances decreases, the magnitude of a ripple voltage generated in the reference voltage may be reduced. The difference value between the first and second parasitic capacitances may be reduced to a level of about $8.0070E^{-14}$.

As the clock wirings and the clock bar wirings are alternately arranged as described above, the magnitude of the ripple generated in the reference voltage may decrease, and as a result, the phenomenon of a horizontal line smear appearing on the screen of the display panel DP may be reduced or prevented.

Referring to FIG. 6C, The first to fourth bridge wirings BL1 to BL4 are respectively connected to the first to fourth clock wirings CKL1 to CKL4 through first to fourth contact electrodes CTE1 to CTE4. The fifth to eighth bridge wirings BL5 to BL8 are respectively connected to the first to fourth clock bar wirings CKBL1 to CKBL4 through fifth to eighth contact electrodes CTBE1 to CTBE4.

As illustrated in FIG. 6D, the first contact electrode CTE1 is disposed on a third layer covering the first bridge wiring BL1. The third layer may be a protective layer PL. A first bridge contact hole B_CNT1 exposing the first clock wiring CKL1 is provided in the protective layer PL and the gate insulating layer GIL, and a second bridge contact hole B_CNT2 exposing the first bridge wiring BL1 is provided in the protective layer PL. The first contact electrode CTE1 may be connected to the first clock wiring CKL1 and the first bridge wiring BL1 through the first and second bridge contact holes B_CNT1 and B_CNT2, respectively. As such, the first clock wiring CKL1 and the first bridge wiring BL1 may be electrically connected through the first contact electrode CTE1.

Each of the clock wirings CKL2 to CKL4 remaining and the clock bar wirings CKBL1 to CKBL4 may also be electrically connected to a corresponding one of the bridge wirings BL2 to BL8 in the above-described manner.

Figure 7:
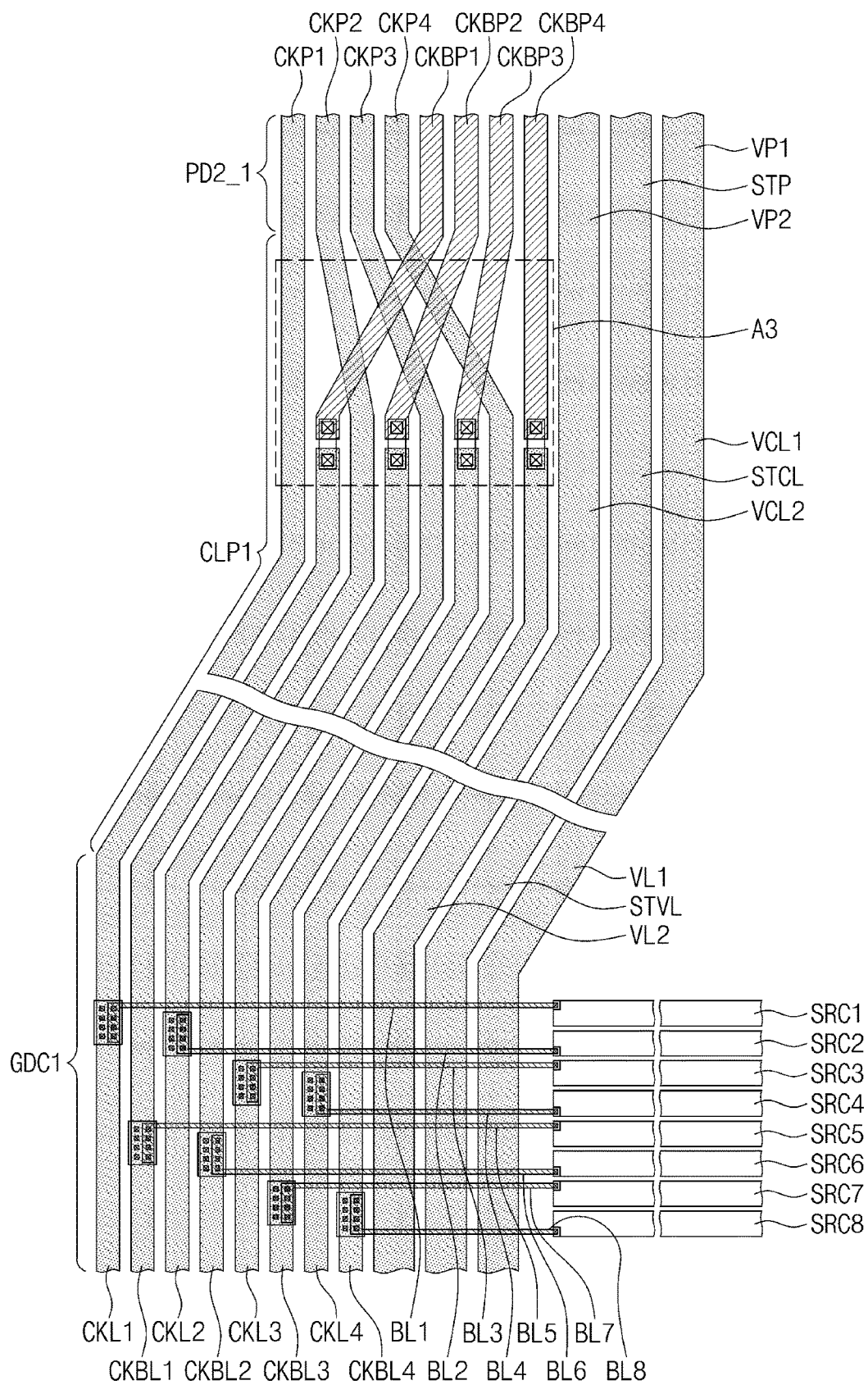
FIG. 7 is an enlarged plan view of a second embodiment of the part AA shown in FIG. 2A.
Figure 8A:
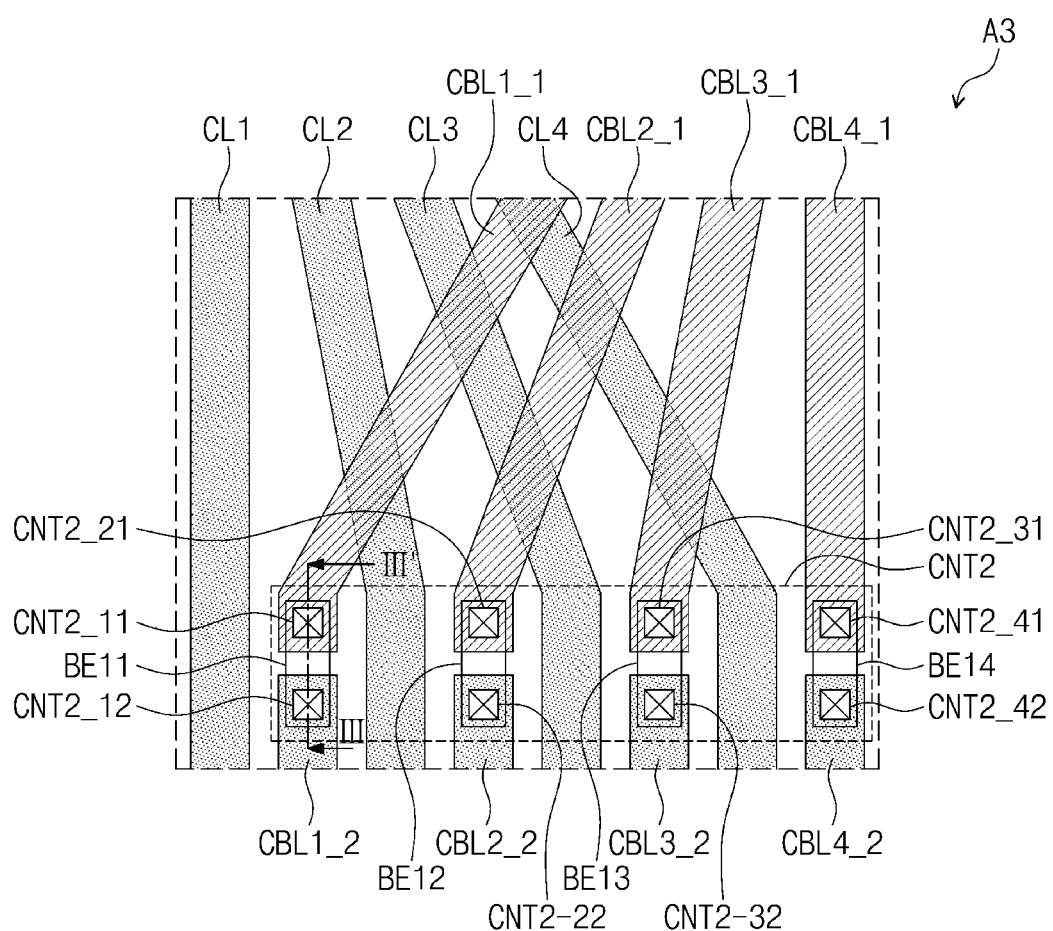
FIG. 8A is an enlarged plan view of the portion A3 of FIG. 7.
Figure 8B:
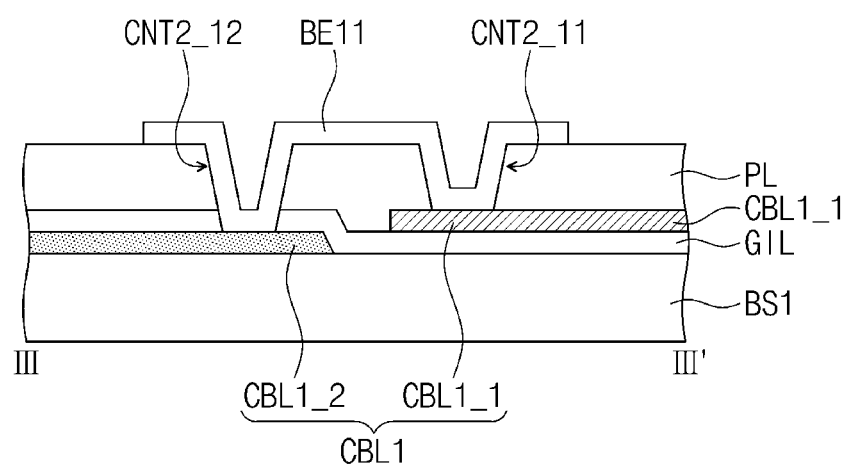
FIG. 8B is a cross-sectional view taken along line of FIG. 8A.

FIG. 7 is an enlarged plan view of a second embodiment of the part AA shown in FIG. 2A. FIG. 8A is an enlarged plan view of the portion A3 of FIG. 7, and FIG. 8B is a cross-sectional view taken along line of FIG. 8A. However, the same reference numeral is given to an element, among the elements of FIGS. 7 to 8B, the same as the element illustrated in FIGS. 5 to 6B, and a detailed description thereof will be omitted to avoid redundancy.

Referring to FIGS. 7 and 8A, a first clock bar intermediate wiring CBL1 includes a first upper wiring CBL1_1 and a first lower wiring CBL1_2. A second clock bar intermediate wiring CBL2 includes a second upper wiring CBL2_1 and a second lower wiring CBL2_2. A third clock bar intermediate wiring CBL3 includes a third upper wiring CBL3_1 and a third lower wiring CBL3_2. A fourth clock bar intermediate wiring CBL4 includes a fourth upper wiring CBL4_1 and a fourth lower wiring CBL4_2.

The first to fourth upper wirings CBL1_1 to CBL4_1 are disposed on a different layer from a layer on which the first to fourth lower wirings CBL1_2 to CBL4_2 are disposed. The first to fourth upper wirings CBL1_1 to CBL4_1 may be disposed on a second layer, and the first to fourth lower wirings CBL1_2 to CBL4_2 may be disposed on a first layer. Here, the first layer may be a first base substrate BS1 and the second layer may be a gate insulating layer GIL.

Referring to FIG. 8A, the first to fourth upper wirings CBL1_1 to CBL4_1 are respectively connected to the first to fourth lower wirings CBL1_2 to CBL4_2 through a second contact part CNT2. The second contact part CNT2 may include first to fourth upper contact holes CNT2_11 to CNT2_41 and first to fourth lower contact holes CNT2_12 to CNT2_42.

The second contact part CNT2 further includes first to fourth bridge electrodes BE11 to BE14. The first to fourth bridge electrodes BE11 to BE14 are provided on a third layer. The third layer may be a protective layer PL. The first bridge electrode BE11 is connected to the first upper wiring CBL1_1 and the first lower wiring CBL1_2 through the first upper contact hole CNT2_11 and the first lower contact hole CNT2_12, respectively. As illustrated in FIG. 8B, the first upper contact hole CNT2_11 is provided in the protective layer PL to expose the first upper wiring CBL1_1, and the first lower contact hole CNT2_12 is provided in the protective layer PL and the gate insulating layer GIL to expose the first lower wiring CBL1_2. Accordingly, the first upper wiring CBL1_1 and the first lower wiring CBL1_2 provided on different layers may be electrically connected through the first bridge electrode BE11. The first upper wiring CBL1_1 and the first lower wiring CBL1_2 may not overlap each other when viewed in a plane.

The second bridge electrode BE12 is connected to the second upper wiring CBL2_1 and the second lower wiring CBL2_2 through the second upper contact hole CNT2_21 and the second lower contact hole CNT2_22, respectively. The third bridge electrode BE13 is connected to the third upper wiring CBL3_1 and the third lower wiring CBL3_2 through the third upper contact hole CNT2_31 and the third lower contact hole CNT2_32, respectively. The fourth bridge electrode BE14 is connected to the fourth upper wiring CBL4_1 and the fourth lower wiring CBL4_2 through the fourth upper contact hole CNT2_41 and the fourth lower contact hole CNT2_42, respectively.

Because the connection structures of the second to fourth bridge electrodes BE12 to BE14 are similar to the connection structure of the first bridge electrode BE11 illustrated in FIG. 8B, a description of the connection structures of the second to fourth bridge electrodes BE12 to BE14 will be omitted to avoid redundancy.

Figure 9:
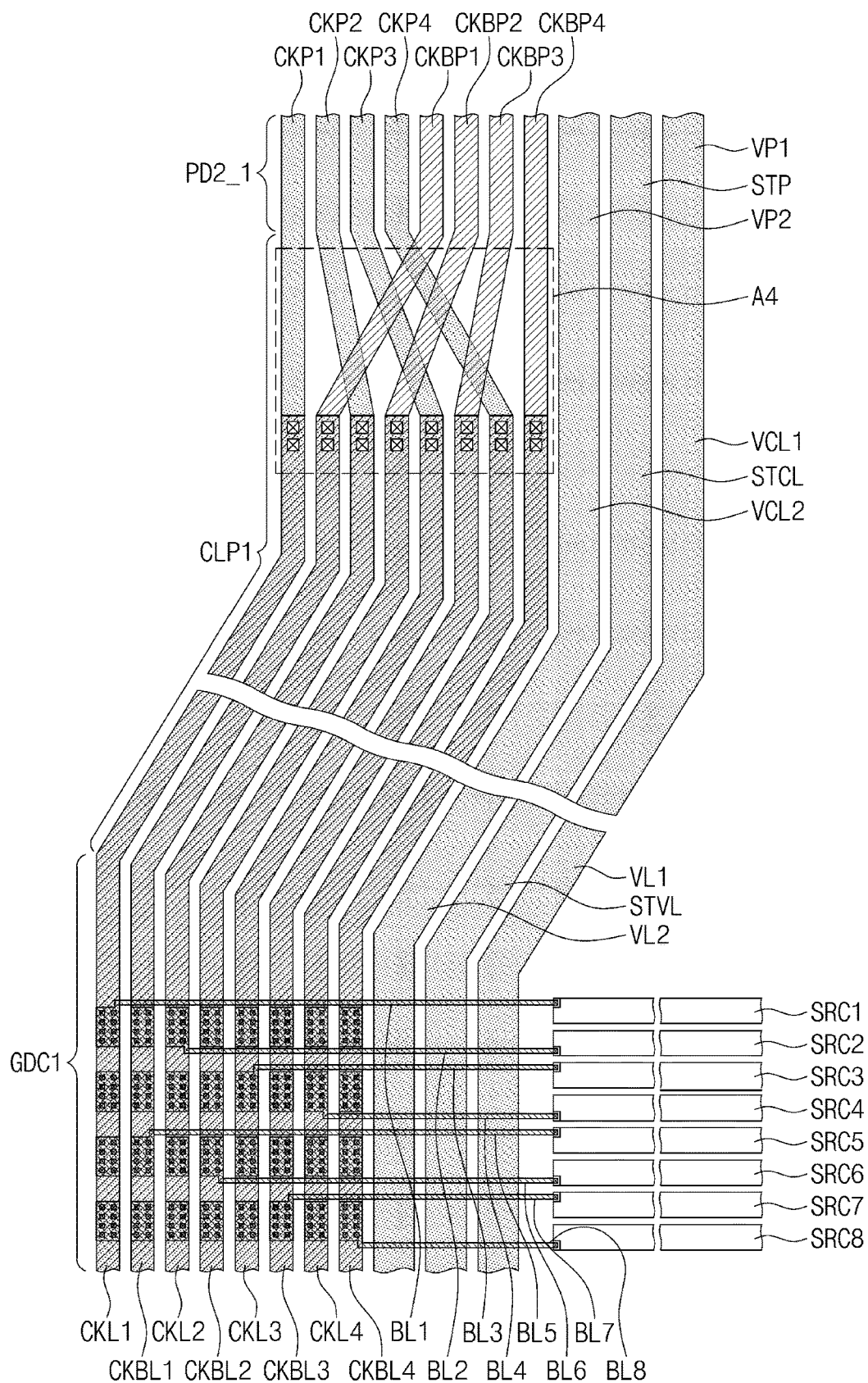
FIG. 9 is an enlarged plan view of a third embodiment of the part AA shown in FIG. 2A.
Figure 10A:
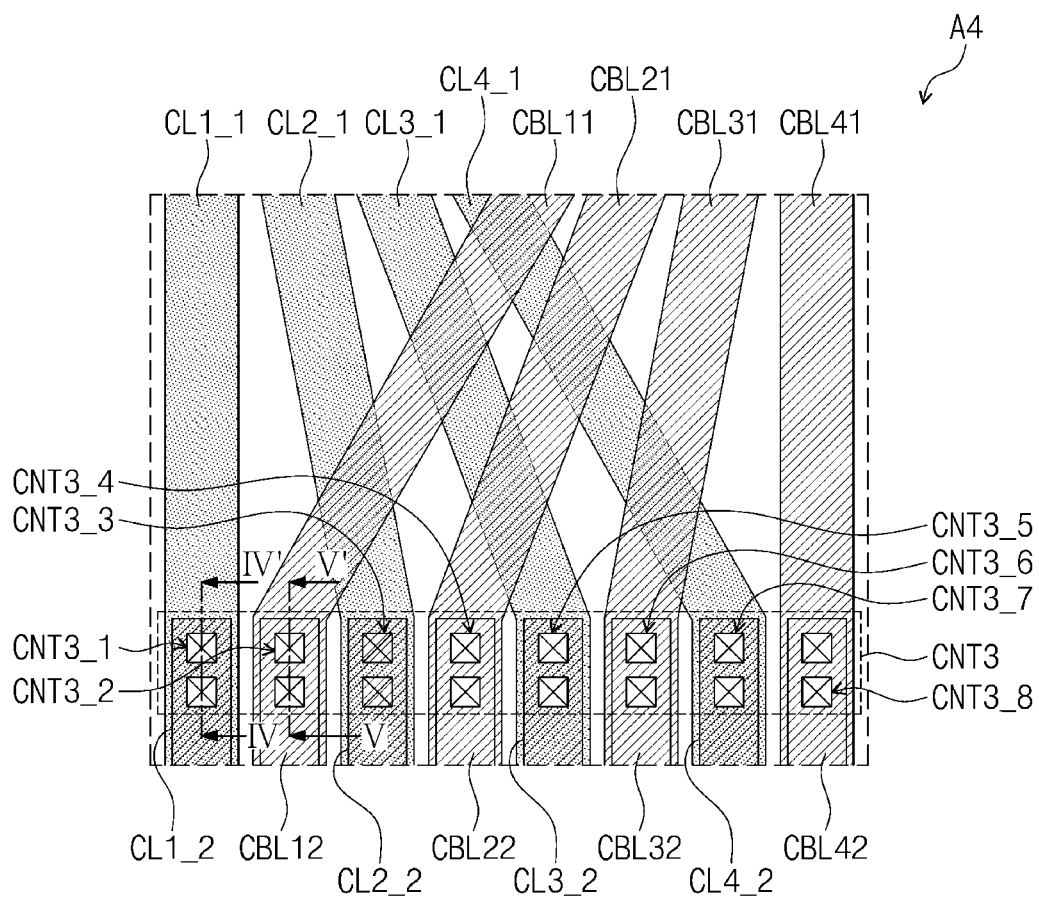
FIG. 10A is an enlarged plan view of an embodiment of the portion A4 of FIG. 9.
Figure 10B:
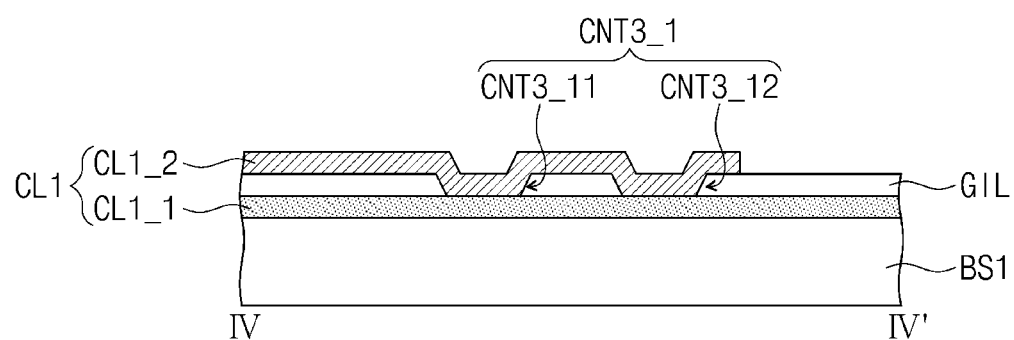
FIG. 10B is a cross-sectional view taken along line IV-IV' of FIG. 10A.
Figure 10C:
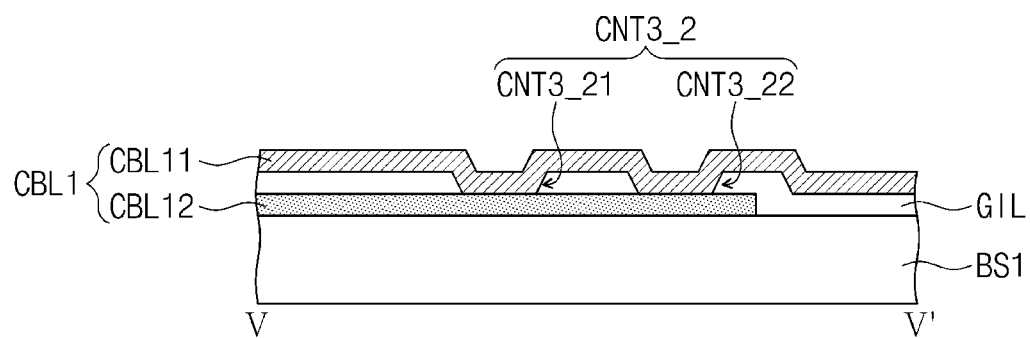
FIG. 10C is a cross-sectional view taken along line V-V of FIG. 10A.

FIG. 9 is an enlarged plan view of a third embodiment of the part AA shown in FIG. 2A. FIG. 10A is an enlarged plan view of an embodiment of the portion A4 of FIG. 9, and FIG. 10B is a cross-sectional view taken along line IV-IV' of FIG. 10A. FIG. 10C is a cross-sectional view taken along line V-V of FIG. 10A. However, the same reference numeral is given to an element, among the elements illustrated in FIGS. 9 to 10C, the same as the element illustrated in FIGS. 5 to 6C, and a detailed description thereof will be omitted to avoid redundancy.

Referring to FIGS. 9 and 10A, a first intermediate wiring part CLP1 is disposed between a first driving pad part PD2_1 and a first gate driver GDC1, and electrically connects the first driving pad part PD2_1 to signal wirings of the first gate driver GDC1. Specifically, as shown in FIG. 10A, the first intermediate wiring part CLP1 may include a plurality of clock intermediate wirings CL1 to CL4, a plurality of clock bar intermediate wirings CBL1 to CBL4, first and second voltage intermediate wirings VCL1 and VCL2, and a start signal intermediate wiring STCL. The plurality of clock intermediate wirings may be first to fourth clock intermediate wirings CL1 to CL4, and the plurality of clock bar intermediate wirings may be first to fourth clock bar intermediate wirings CBL1 to CBL4.

The first to fourth clock intermediate wirings CL1 to CL4 connect first to fourth clock wirings CKL1 to CKL4 and first to fourth clock pads CKP1 to CKP4. Each of the first to fourth clock intermediate wirings CL1 to CL4 may have a double layer structure. Specifically, referring to FIG. 10A, the first clock intermediate wiring CL1 includes a first lower conductive layer CL1_1 and a first upper conductive layer CL1_2, and the second clock intermediate wiring CL2 includes a second lower conductive layer CL2_1 and a second upper conductive layer CL2_2. The third clock intermediate wiring CL3 includes a third lower conductive layer CL3_1 and a third upper conductive layer CL3_2, and the fourth clock intermediate wiring CL4 includes a fourth lower conductive layer CL4_1 and a fourth upper conductive layer CL4_2.

The first to fourth lower conductive layers CL1_1 to CL4_1 are disposed on a different layer from a layer on which the first to fourth upper conductive layers CL_2 to CL4_2 are disposed. The first to fourth lower conductive layers CL1_1 to CL4_1 are directly connected to the first to fourth clock pads CKP1 to CKP4.

The first to fourth clock bar intermediate wirings CBL1 to CBL4 connect first to fourth clock bar wirings CKBL1 to CKBL4 and first to fourth clock bar pads CKBP1 to CKBP4. Each of the first to fourth clock bar intermediate wirings CBL1 to CBL4 may have a double layer structure. Specifically, referring to FIG. 10A, the first clock bar intermediate wiring CBL1 includes a fifth upper conductive layer CBL11 and a fifth lower conductive layer CBL12, and the second clock bar intermediate wiring CBL2 includes a sixth upper conductive layer CBL21 and a sixth lower conductive layer CBL22. The third clock bar intermediate wiring CBL3 includes a seventh upper conductive layer CBL31 and a seventh lower conductive layer CBL32, and the fourth clock bar intermediate wiring CBL4 includes an eighth upper conductive layer CBL41 and an eighth lower conductive layer CBL42.

The fifth to eighth lower conductive layers CBL12 to CBL42 are disposed on a different layer from the layer on which the fifth to eighth upper conductive layers CBL11 to CBL41 are disposed. The fifth to eighth upper conductive layers CBL11 to CBL41 are directly connected to the first to fourth clock bar pads CKBP1 to CKBP4.

The fifth to seventh upper conductive layers CBL11 to CBL31 may cross the second to fourth lower conductive layers CL2_1 to CL4_1. Specifically, referring to FIG. 10A, the fifth upper conductive layer CBL11 crosses the second to fourth lower conductive layers CL2_1 to CL4_1, the sixth upper conductive layer CBL21 crosses the third and fourth lower conductive layers CL3_1 and CL4_1, and the seventh upper conductive layer CBL31 crosses the fourth lower conductive layer CL4_1.

The first to eighth lower conductive layers CL1_1 to CL4_1 and CBL12 to CBL42 are respectively connected to the first to eighth upper conductive layers CL1_2 to CL4_2 and CBL11 to CBL41 through a third contact part CNT3. The third contact part CNT3 includes first to eighth sub contact parts CNT3_1 to CNT3_8.

FIG. 10B illustrates the structure of the first sub contact part CNT3_1. The first lower conductive layer CL1_1 is provided on a first base substrate BS1, and the first upper conductive layer CL1_2 is disposed on a gate insulating layer GIL. The first sub contact part CNT3_1 includes a first sub contact hole CNT3_11 and a second sub contact hole CNT3_12. The first and second sub contact holes CNT3_11 and CNT3_12 are provided in the gate insulating layer GIL to expose the first lower conductive layer CL1_1. The first upper conductive layer CL1_2 is directly connected to the first lower conductive layer CL1_1 through the first and second sub contact holes CNT3_11 and CNT3_12.

Because the structures of the third, fifth and seventh sub contact parts CNT3_3, CNT3_5 and CNT3_7 are similar to the structure of the first sub contact part CNT3_1, a description of the structures of the third, fifth and seventh sub contact parts CNT3_3, CNT3_5 and CNT3_7 is omitted to avoid redundancy.

FIG. 10C illustrates the structure of the second sub contact part CNT3_2. The fifth lower conductive layer CBL12 is provided on the first base substrate BS1, and the fifth upper conductive layer CBL11 is disposed on the gate insulating layer GIL. The second sub contact part CNT3_2 includes a third sub contact hole CNT3_21 and a fourth sub contact hole CNT3_22. The third and fourth sub contact holes CNT3_21 and CNT3_22 are provided in the gate insulating layer GIL to expose the fifth lower conductive layer CBL12. The fifth upper conductive layer CBL11 is directly connected to the fifth lower conductive layer CBL12 through the third and fourth sub contact holes CNT3_21 and CNT3_22.

Because the structures of the fourth, sixth and eighth sub contact parts CNT3_4, CNT3_6 and CNT3_8 are similar to the structure of the second sub contact part CNT3_2, a description of the structures of the fourth, sixth and eighth sub contact parts CNT3_4, CNT3_6 and CNT3_8 is omitted to avoid redundancy.

Figure 11A:
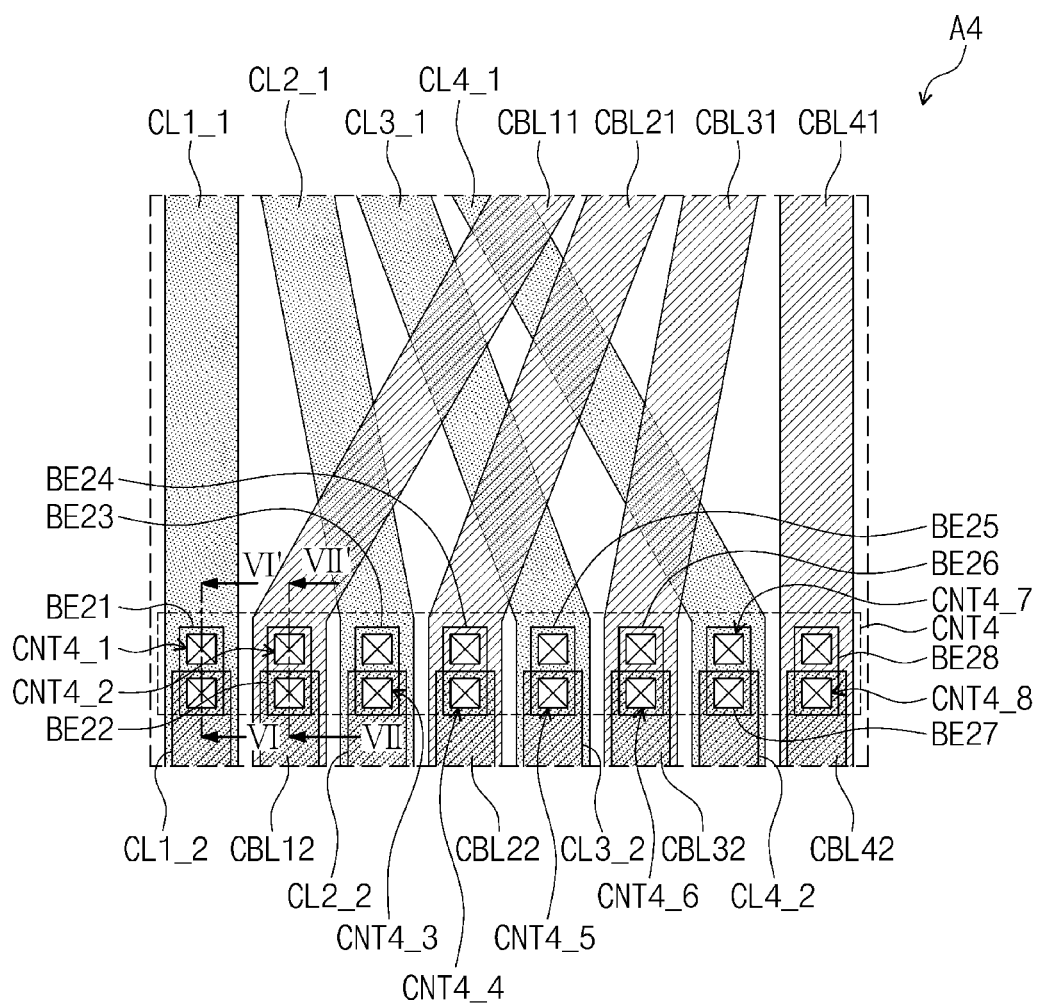
FIG. 11A is an enlarged plan view of another embodiment of the portion A4 of FIG. 9.
Figure 11B:
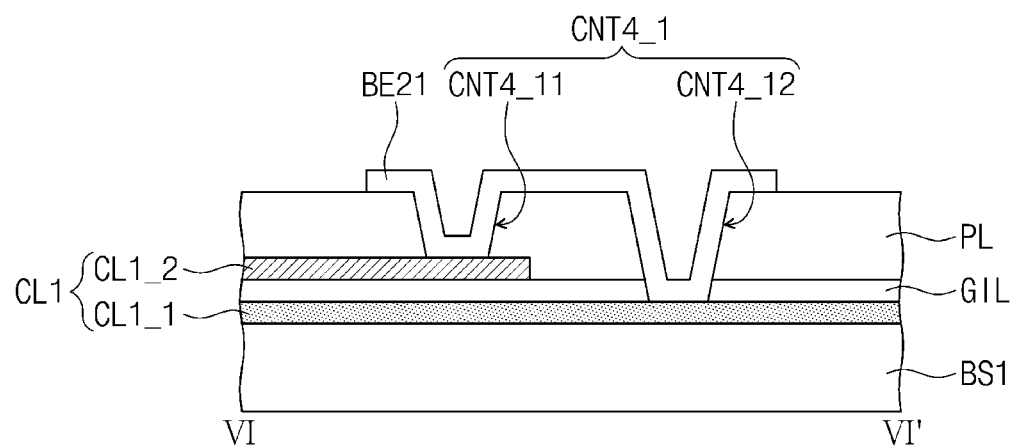
FIG. 11B is a cross-sectional view taken along line VI-VI' of FIG. 11A.
Figure 11C:
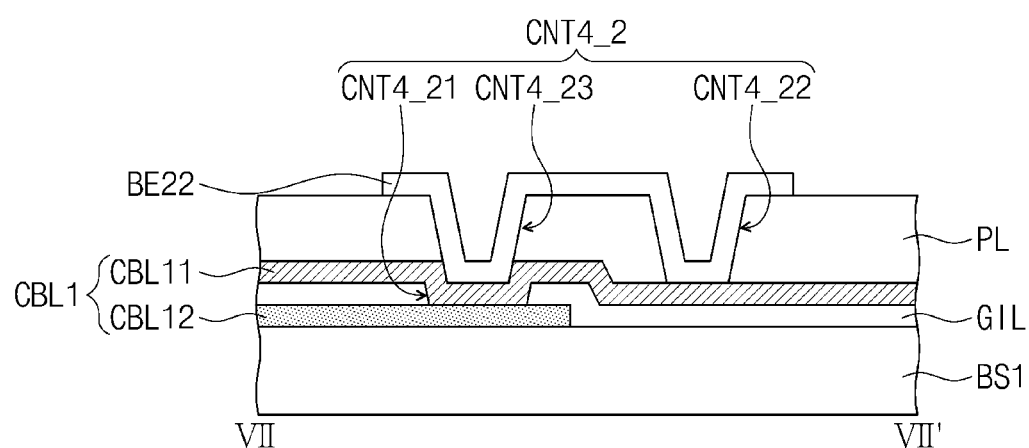
FIG. 11C is a cross-sectional view taken along line VII-VII' of FIG. 11A.

FIG. 11A is an enlarged plan view of another embodiment of the portion A4 of FIG. 9, FIG. 11B is a cross-sectional view taken along line VI-VI' of FIG. 11A, and FIG. 11C is a cross-sectional view taken along line VII-VII' of FIG. 11A.

Referring to FIGS. 11A to 11C, first to eighth lower conductive layers CL1_1 to CL4_1 and CBL12 to CBL42 are respectively connected to first to eighth upper conductive layers CL1_2 to CL4_2 and CBL11 to CBL41 through a fourth contact part CNT4. The fourth contact part CNT4 includes first to eighth sub contact parts CNT4_1 to CNT4_8. First to eighth bridge electrodes BE21 to BE28 are respectively provided to the first to eighth sub contact parts CNT4_1 to CNT4_8.

FIG. 11B illustrates the structure of the first sub contact part CNT4_1. The first lower conductive layer CL1_1 is provided on a first base substrate BS1, and the first upper conductive layer CL1_2 is disposed on a gate insulating layer GIL. The first sub contact part CNT4_1 includes a first sub contact hole CNT4_11, a second sub contact hole CNT4_12, and the first bridge electrode BE21. The first sub contact hole CNT4_11 is provided in a protective layer PL to expose the first upper conductive layer CL1_2. The second sub contact hole CNT4_12 is provided in the protective layer PL and the gate insulating layer GIL to expose the first lower conductive layer CL1_1.

The first bridge electrode BE21 is connected to the first lower conductive layer CL1_1 and the first upper conductive layer CL1_2 through the first and second sub contact holes CNT4_11 and CNT4_12. Accordingly, the first lower conductive layer CL1_1 and the first upper conductive layer CL1_2 are electrically connected to each other through the first bridge electrode BE21.

Because the structures of the third, fifth and seventh sub contact parts CNT4_3, CNT4_5 and CNT4_7 are similar to the structure of the first sub contact part CNT4_1, a description of the structures of the third, fifth and seventh sub contact parts CNT4_3, CNT4_5 and CNT4_7 is omitted to avoid redundancy.

FIG. 11C illustrates the structure of the second sub contact part CNT4_2. The fifth lower conductive layer CBL12 is provided on the first base substrate BS1, and the fifth upper conductive layer CBL11 is disposed on the gate insulating layer GIL. The second sub contact part CNT4_2 includes a third sub contact hole CNT4_21, a fourth sub contact hole CNT4_22, a fifth sub contact hole CNT4_23, and the second bridge electrode BE22. The third sub contact hole CNT4_21 is provided in the gate insulating layer GIL to expose the fifth lower conductive layer CBL12. The fifth upper conductive layer CBL11 is directly connected to the fifth lower conductive layer CBL12 through the third sub contact hole CNT4_21. The fourth and fifth sub contact holes CNT4_22 and CNT4_23 are provided in the protective layer PL to expose the fifth upper conductive layer CBL11. The second bridge electrode BE22 is directly connected to the fifth upper conductive layer CBL11 through the fourth and fifth sub contact holes CNT4_22 and CNT4_23. The second bridge electrode BE22 may be omitted.

The structures of the fourth, sixth and eighth sub contact parts CNT4_4, CNT4_6 and CNT4_8 are similar to the structure of the second sub contact part CNT4_2, and thus a description of the structures of the fourth, sixth and eighth sub contact parts CNT4_4, CNT4_6 and CNT4_8 is omitted to avoid redundancy.

Figure 12:
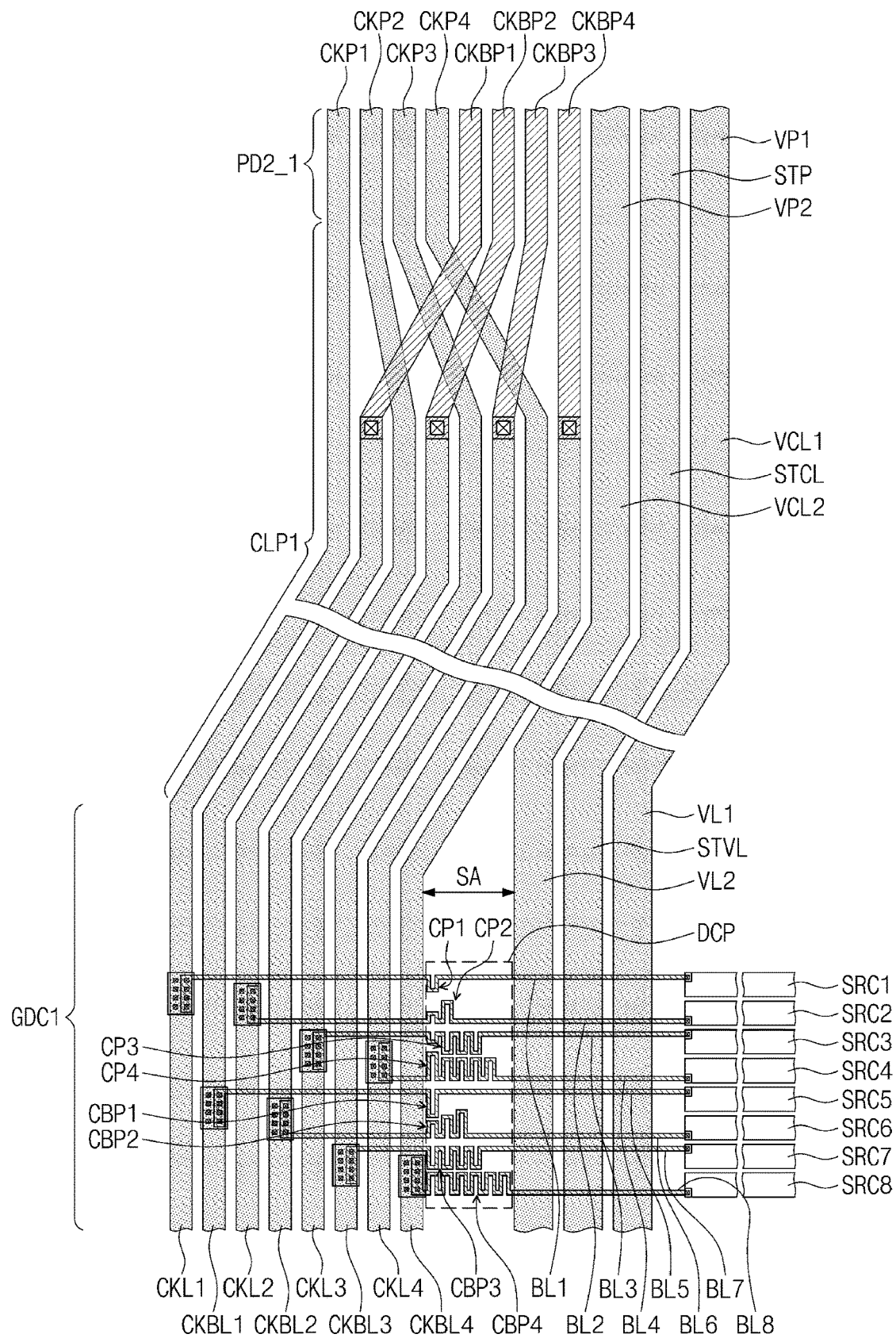
FIG. 12 is an enlarged plan view of a fourth embodiment of the part AA shown in FIG. 2A.

FIG. 12 is an enlarged plan view of a fourth embodiment of the part AA shown in FIG. 2A. However, the same reference numeral is given to an element, among the elements illustrated in FIG. 12, the same as the element illustrated in FIG. 5, and a detailed description thereof will be omitted to avoid redundancy.

Referring to FIG. 12, a first gate driver GDC1 further includes a compensation part DCP to compensate for a difference in length between bridge wirings. The compensation part DCP may be disposed in a separation space SA between a fourth clock bar wiring CKBL4 and a second voltage wiring VL2. However, the position of the compensation part DCP is not limited thereto. For example, the compensation part DCP may be disposed between a first voltage wiring VL1 and stages SRC1 to SRC8.

The compensation part DCP includes a plurality of compensation patterns. The plurality of compensation patterns may include first to eighth compensation patterns CP1 to CP8 respectively connected to first to eighth bridge wirings BL1 to BL8.

The length of each of the compensation patterns may be inversely proportional to the length of a corresponding one of the bridge wirings. That is, when the length of a bridge wiring of the bridge wirings is long, the length of a compensation pattern connected thereto may be short, and when the length of a bridge wiring is short, the length of a compensation pattern connected thereto may be long. Accordingly, the sum of the length of the first compensation pattern CP1 and the length of the first bridge wiring BL1 may be the same as the sum of the length of the second compensation pattern CP2 and the length of the second bridge wiring BL2. By respectively connecting the compensation patterns having different lengths to the bridge wirings, the difference in length between the bridge wirings may be compensated.

According to the principles and embodiments of the invention illustrated above, as the clock wirings and the clock bar wirings are alternately arranged, the difference in length may be reduced between the bridge wirings electrically connected to the clock wirings to which the clock signals are applied and the bridge wirings electrically connected to the clock bar wirings to which the clock bar signals are applied.

When the difference in length between the bridge wirings is reduced, the difference between the parasitic capacitances formed between the bridge wirings and the reference electrode decreases, and as a result, the magnitude of a ripple voltage generated in the reference voltage may be reduced.

As the clock wirings and the clock bar wirings are alternately arranged as described above, the magnitude of a ripple voltage generated in the reference voltage may decrease, and as a result, horizontal line smear may be prevented from appearing on the screen of the display panel, thereby improving display quality.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display apparatus comprising a display panel including:
    a plurality of pixels to display an image;
    a gate driver to drive the pixels;
    a first part electrically connected to the pixels; and
    a second part electrically connected to the gate driver,
    wherein the gate driver comprises:
        a plurality of stages to generate a gate signal to be provided to the pixels;
        k number of clock wirings to provide k number of clock signals to the plurality of stages; and
        k number of clock bar wirings to provide k number of clock bar signals to the plurality of stages (where k is a natural number of one or greater), and
    the second part comprises:
        k number of clock pads electrically connected to the k number of clock wirings, respectively; and
        k number of clock bar pads electrically connected to the k number of clock bar wirings, respectively,
    wherein the k number of clock wirings and the k number of clock bar wirings are arranged in a first order, and the k number of clock pads and the k number of clock bar pads are arranged in a second order different from the first order,
    wherein a first clock wiring of the k number of clock wirings to receive a first clock signal is disposed closer to a first clock bar wiring of the k number of clock bar wirings to receive a first clock bar signal than a second clock wiring of the k number of clock wirings to receive a second clock signal, the first clock bar signal has a phase inverted with respect to a phase of the first clock signal, and the second clock signal is delayed from the first clock signal, and
    wherein a first clock pad electrically connected to the first clock wiring of the k number of clock pads is disposed closer to a second clock pad electrically connected to the second clock wiring than the first clock bar pad electrically connected to the first clock bar wiring.

2. The display apparatus of claim 1, wherein the first clock bar wiring is disposed between the first clock wiring and the second clock wiring.

3. The display apparatus of claim 1, wherein the first part comprises a first pad part and the second part comprises a second pad part and the display panel further comprises an intermediate wiring part to electrically connect the second pad part and the gate driver,
    wherein the intermediate wiring part further comprises:
        k number of first intermediate wirings to electrically connect the k number of clock pads to the k number of clock wirings, respectively; and
        k number of second intermediate wirings to electrically connect the k number of clock bar pads to the k number of clock bar wirings, respectively.

4. The display apparatus of claim 3, wherein at least one of the k number of first intermediate wirings intersects at least one of the k number of second intermediate wirings.

5. The display apparatus of claim 4, wherein
    the k number of first intermediate wirings are disposed on a first layer, and
    each of the k number of second intermediate wirings comprises:
        a lower wiring disposed on the first layer; and
        an upper wiring disposed on a second layer different from the first layer.

6. The display apparatus of claim 5, wherein at least one of the k number of first intermediate wirings intersects the upper wiring of at least one of the k number of second intermediate wirings.

7. The display apparatus of claim 5, wherein the intermediate wiring part further comprises a contact part to which the lower wiring and the upper wiring are connected.

8. The display apparatus of claim 7, wherein the lower wiring and the upper wiring are directly connected in the contact part.

9. The display apparatus of claim 7, wherein the contact part comprises a bridge electrode to connect the lower wiring and the upper wiring.

10. The display apparatus of claim 1, wherein the gate driver further comprises:
    k number of first bridge wirings to connect the k number of clock wirings to the plurality of stages; and
    k number of second bridge wirings to connect the k number of clock bar wirings to the plurality of stages.

11. The display apparatus of claim 10, wherein the first clock bar wiring is disposed between the first clock wiring and the second clock wiring.

12. The display apparatus of claim 11, wherein
    a first bridge wiring connected to the first clock wiring is longer than a second bridge wiring connected to the first clock bar wiring, and
    a first bridge wiring connected to the second clock wiring is shorter than the second bridge wiring connected to the first clock bar wiring.

13. A display apparatus comprising a display panel including:
    a plurality of pixels to display an image;
    a gate driver to drive the pixels;
    a first part electrically connected to the pixels; and
    a second part electrically connected to the gate driver,
    wherein the gate driver comprises:
        a plurality of stages to generate a gate signal to be applied to the pixels;

k number of clock wirings to apply k number of clock signals to the plurality of stages; and k number of clock bar wirings to apply k number of clock bar signals to the plurality of stages (where k is a natural number of one or greater), and the second part comprises:

k number of clock pads electrically connected to the k number of clock wirings, respectively; and k number of clock bar pads electrically connected to the k number of clock bar wirings, respectively, wherein a first clock wiring of the k number of clock wirings to receive a first clock signal is disposed closer to a first clock bar wiring of the k number of clock bar wirings to receive a first clock bar signal than a second clock wiring of the k number of clock wirings to receive a second clock signal, the first clock bar signal has a phase inverted with respect to a phase of the first clock signal, and the second clock signal is delayed from the first clock signal, and wherein a first clock pad electrically connected to the first clock wiring of the k number of clock pads is disposed closer to a second clock pad electrically connected to the second clock wiring than the first clock bar pad electrically connected to the first clock bar wiring.

14. The display apparatus of claim 13, further comprising a flexible film coupled to one side of the display panel, wherein the flexible film is electrically connected to the first part and the second part.

15. The display apparatus of claim 13, wherein the first part comprises a first pad part and the second part comprises a second pad part and the display panel further comprises an intermediate wiring part to connect the second pad part and the gate driver, wherein the intermediate wiring part further comprises:

k number of first intermediate wirings to electrically connect the k number of clock pads to the k number of clock wirings, respectively; and k number of second intermediate wirings to electrically connect the k number of clock bar pads to the k number of clock bar wirings, respectively.

16. The display apparatus of claim 15, wherein at least one of the k number of first intermediate wirings intersects at least one of the k number of second intermediate wirings.

17. The display apparatus of claim 15, wherein the k number of first intermediate wirings are disposed on a first layer, and each of the k number of second intermediate wirings comprises:

a lower wiring disposed on the first layer; and an upper wiring disposed on a second layer different from the first layer.

18. The display apparatus of claim 17, wherein at least one of the k number of first intermediate wirings intersects the upper wiring of at least one of the k number of second intermediate wirings.

* * * * *